(12) United States Patent
Murayama et al.

(10) Patent No.: US 6,497,310 B2
(45) Date of Patent: Dec. 24, 2002

(54) DRUM BRAKE DEVICE

(75) Inventors: Takashi Murayama, Kariya (JP);
Daizo Ooba, Kariya (JP); Kazuo Masaki, Chita (JP)

(73) Assignee: Denso Corporation, Kariya (JP)

( * ) Notice: Subject to any disclaimer, the term of this patent is extended or adjusted under 35 U.S.C. 154(b) by 6 days.

(21) Appl. No.: 09/884,916

(22) Filed: Jun. 21, 2001

(65) Prior Publication Data

US 2002/0000350 A1 Jan. 3, 2002

(30) Foreign Application Priority Data

Jun. 23, 2000 (JP) ........................................ 2000-189598
Jan. 29, 2001 (JP) .......................................... 2001-20163

(51) Int. Cl.$^7$ ............................................. F16D 51/00
(52) U.S. Cl. .......................................... 188/325; 188/78
(58) Field of Search ................................ 188/325, 327, 188/328, 78

(56) References Cited

U.S. PATENT DOCUMENTS

| | | | | |
|---|---|---|---|---|
| 1,363,607 A | * | 12/1920 | Lovejoy | 188/204 R |
| 1,699,307 A | * | 1/1929 | North | 188/325 |
| 1,770,959 A | * | 7/1930 | Weed | 188/325 |
| 1,871,260 A | * | 8/1932 | Delahaye | 188/106 A |
| 1,911,439 A | * | 5/1933 | Delahaye | 188/325 |
| 1,943,816 A | * | 1/1934 | Delahaye | 188/327 |
| 1,959,878 A | * | 5/1934 | Schroeder | 188/166 |
| 1,967,414 A | * | 7/1934 | Brie | 188/78 |
| 2,002,813 A | * | 5/1935 | Harper et al. | 188/326 |
| 2,071,669 A | * | 2/1937 | Wadsworth | 188/106 A |
| 2,232,308 A | * | 2/1941 | Berglund | 188/152 |
| 2,247,610 A | * | 7/1941 | Frederickson | 188/206 A |
| 2,347,239 A | * | 4/1944 | Berno | 188/325 |
| 2,381,654 A | * | 8/1945 | Edmonds | 188/334 |
| 2,400,042 A | * | 5/1946 | Goepfrich | 188/326 |
| 3,612,228 A | * | 10/1971 | Rick | 188/106 P |
| 5,219,049 A | * | 6/1993 | Unterborn | 188/156 |
| 5,310,026 A | * | 5/1994 | Shaw et al. | 188/156 |
| 6,125,976 A | * | 10/2000 | Asai et al. | 188/328 |
| 6,131,711 A | | 10/2000 | Maehara | |
| 6,186,294 B1 | | 2/2001 | Maehara | |

FOREIGN PATENT DOCUMENTS

JP    A-2000-346104    12/2000

* cited by examiner

*Primary Examiner*—Jack Lavinder
*Assistant Examiner*—Robert A. Siconolfi
(74) *Attorney, Agent, or Firm*—Law Offices of David G. Posz

(57) ABSTRACT

The present invention to provides a drum brake that generates the same braking force when a vehicle moves forward and backward. A first lever is connected to a second lever by a strut. A fourth lever provided with an anchor member and a third lever for connecting the fourth lever and the first lever to the end of the fourth lever) opposite to the anchor member across a screw which is the center of swing of the fourth lever. Accordingly, when the vehicle moves forward, an anchor load is received by the anchor member and the second lever. When the vehicle moves backward, the anchor load is received by the anchor member and the first lever.

16 Claims, 11 Drawing Sheets

DRUM BRAKE DEVICE

CROSS-REFERENCE TO RELATED APPLICATION

The present invention is related to Japanese patent application No. 2000-189598, filed Jun. 23, 2000; 2001-20163, filed Jan. 29, 2001, the contents of which are incorporated herein by reference.

FIELD OF THE INVENTION

The present invention relates to an electric drum brake device used for a vehicle brake and, more particularly, an electric drum brake device applied to a duo-servo braking force control type drum brake device.

BACKGROUND OF THE INVENTION

The present applicant, in Japanese Patent Application No. 2000-52305, proposed a braking force control type drum brake device which suppresses a change in the braking force due to variations in the coefficient of friction. In this application, a lever for pressing a first shoe is connected to a lever for receiving a second shoe by a strut to provide a lever ratio of N. In this configuration, an anchor load applied to the lever for receiving the second shoe is fed back to the lever for pressing the first shoe to generate a braking torque by a resultant force to reduce a change in the braking force by a coefficient of friction between the shoe and a drum.

Here, as the lever ratio is smaller, the stability of the braking force is improved. However, motor power necessary for producing the braking force is increased. For this reason, it is necessary to select a lever ratio satisfying both and to set the lever ratio larger than 1.

Now, a braking torque when a vehicle moves forward and a braking torque when the vehicle moves backward, in the configuration disclosed in the prior application, is reviewed.

First, when the vehicle moves forward, the lever of the first shoe is an input and the lever of the second shoe is an anchor load. A braking torque is produced when the resultant force balances the motor output. For this reason, the braking torque TF when the vehicle moves forward is expressed by the following equation $$TF = BEF \times Fm \times (1/(1+Fan/N)) \times R \qquad \text{(Equation 13)}$$

where BEF is a brake effectiveness factor (mainly determined by a coefficient of friction between a shoe and a drum), Fm is the motor output, Fan is a force applied to the anchor member (mainly determined by BEF), and R is a radius of the drum.

On the other hand, when the vehicle moves backward, the lever of the second shoe is an input and the lever of the first shoe is the anchor load. The braking force is produced when the resultant force thereof balances the motor output. For this reason, a braking torque TR when the vehicle moves backward is expressed by the following equation:

$$TR = BEF \times Fm \times (1/(1+Fan \times N)) \times R$$

However, when the lever ratio is set larger than 1, as described above, $(1/(1+Fan/N)) > (1/(1+Fan \times N))$, that is, $TF > TR$ and therefore the motor output is equal when the vehicle moves forward backward, the braking force when the vehicle moves backward is smaller than the braking force when the vehicle moves forward.

For this reason, in order to generate the same braking force when the vehicle moves forward and backward, the motor output must be set in accordance with the braking torque when the vehicle moves backward, thereby requiring the size of the motor to be increased.

SUMMARY OF THE INVENTION

In view of these and other drawbacks, a first object of the present invention is to provide a drum brake device capable of easily adjusting the braking force when a vehicle moves forward and when the vehicle moves backward.

Further, it is another object of the present invention to provide a drum brake device having a structure capable of generating the same braking force by the same motor output when a vehicle moves forward and backward.

Accordingly, a first aspect provides a driving force generating unit for generating a driving force responsive to the application of brakes on a vehicle; a first shoe having a first contact surface capable of contacting the inner peripheral surface of a rotary drum and being moved so that the first contact surface contacts the inner peripheral surface of the drum based on the driving force generated by the driving force generating unit; a second shoe having a second contact surface capable of contacting the inner peripheral surface of the drum and being moved in connection with the first shoe; a first lever having a contact portion with the first shoe and applying a load in the direction of the inner peripheral surface of the drum to the first shoe based on the driving force of the driving force generating unit; a second lever having a contact portion with the second shoe and applying a load in the direction of the inner peripheral surface of the drum to the second shoe based on the driving force of the driving force generating unit; a strut connected to the first lever and the second lever to connect the first lever to the second lever; an anchor member for receiving an anchor load generated by the first shoe or the second shoe; and a third lever connected to a portion of the first lever between the connection portion of the first lever with the strut and the contact portion of the first lever with the first shoe to feed back the load applied to the anchor member 18 to the first lever.

As described above, since the anchor load generated by the first shoe or the second shoe is fed back to the first lever via the third lever, either one of the anchor loads are fed back. In this way, the load applied to the first shoe or the second shoe by the first lever is controlled, and even if variations in a coefficient of friction occur, it is possible to prevent variations in a braking force and brake effectiveness factor.

In another aspect, if the brakes are applied when the drum is rotated in the first direction F, the first and second contact surfaces are put into contact with the inner peripheral surface of the drum. And, the second shoe is pressed by the first shoe to generate an anchor load which is applied to two portions of the contact portion of the second lever with the second shoe and the anchor member, and if the brakes are applied when the drum is rotated in the second direction B, the first and second contact surfaces contact with the inner peripheral surface of the drum and the first shoe is pressed by the second shoe to generate an anchor load which is applied to two portions of the contact portion of the first lever with the first shoe and the anchor member.

In another aspect, if the brakes are applied when the drum is rotated in the first direction, the third lever receives the load applied to the anchor member to apply a load to the first lever in the direction in which the load applied to the first shoe by the first lever is decreased, and if the brakes are applied when the drum is rotated in the second direction, the third lever receives the load applied to the anchor member to apply a load to the first lever in the direction in which the load applied to the first shoe by the first lever is increased.

In another aspect, a fourth lever is provided which can be swung around a predetermined portion and has the anchor member arranged at one side of the predetermined portion and is connected to the third lever at the other side of the predetermined portion. It is possible to feed back the anchor load from the third lever to the first lever by the fourth lever having such a configuration.

In another aspect, by connecting the end portion of the first lever, opposite to the contact portion thereof, with the first shoe across the connection portion thereof to the strut to an output lever 7 to which the driving force of the driving force generating unit is outputted, it is possible to drive the first lever by the driving force generating unit.

In another aspect, the equations for calculating brake effectiveness factors BEFembf, BEFembr in the first and second directions are formed based on the relationship of the forces generated at the various portions when the drum is rotated in the first and second directions and that the lever ratios of the first, second, and fourth levers are set based on the equations.

In this way, it is possible to set the lever ratios of the respective levers based on the equations for calculating the brake effectiveness factors BEFembf, BEFembr.

In this case, in another aspect, if the ratios of the respective levers are set so that the brake effectiveness factor BEFembf is equal to the brake effectiveness factor BEFembr, it is possible to obtain the same braking force when the vehicle moves forward and backward.

In another aspect, the transfer portions of force by a link mechanism including the first shoe, the second shoe, the first lever, the second lever, the third lever and the strut are arranged on the same plane perpendicular to an axle. According to this configuration, it is possible to transfer a load by the link mechanism on the same plane and hence to improve the transfer efficiency of the load (force) and to suppress the hysteresis of the braking torque to the torque generated by the driving force generating unit.

For example, in another aspect, the transfer portions of the respective forces in the contact portion of the first shoe with the first lever, the connecting portion 12a of the first lever to the strut, the contact portion 9 of the second shoe with the second lever, and the contact portion of the second lever with the strut are arranged on the same plane perpendicular to the axle.

In another aspect, between a plurality of driving balls contacting both a screw shaft portion and a nut portion, provided in a speed reducing mechanism, are disposed contact preventing members, 60c that prevent the respective driving balls from contacting. Accordingly, the sliding resistance between the driving balls is reduced and the transfer efficiency of force of the speed reducing mechanism is improved and the above-mentioned effect of suppressing the hysteresis is provided.

In another aspect, a spacer ball can be used that is smaller than the driving ball as the contact preventing member. Further, according to another aspect, a retainer shaped like a drum in cross section can be used as the contact preventing member.

In another aspect, the number of circulations (the number of circuits) of sets of driving balls which are mounted spirally in contact with both the screw shaft portion and the nut portion is plural. According to this configuration, it is possible to elongate the effective length of the shaft of the screw shaft portion with respect to the diameter of the shaft thereof. Hence, the ball screw can be prevented from tilting. For this reason, it is possible to improve the transfer efficiency of force of the speed reducing mechanism and to produce the above-mentioned effect of suppressing the hysteresis.

In another aspect, the speed reducing mechanism has a hollow housing in which a screw shaft support portion for driving the screw shaft portion and the nut portion can slide, and which has a hole through which the screw shaft support portion is arranged, a bearing 40 which is disposed in the hole of the housing 38 and supports the screw shaft support portion, lubricating oil or grease packed in the space formed by the housing and the nut portion, and a sealing member which is arranged with the bearing in the hole of the housing.

Since the sealing member is provided in this manner in the hole of the housing where the bearing is arranged, it is possible to prevent the lubricating oil from leaking outside the housing. For this reason, it is possible effectively rotate the screw shaft portion and to improve the transfer efficiency of force of the speed reducing mechanism and to produce the above-mentioned effect of suppressing the hysteresis.

In this respect, the reference characters of the respective units and members designate the relationship corresponding to the specific units or members in the preferred embodiments described below.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description. In the drawings:

BRIEF DESCRIPTION OF THE DRAWINGS

The present invention will become more fully understood from the detailed description and the accompanying drawings, wherein.

DESCRIPTION OF THE PREFERRED EMBODIMENTS

First Embodiment

Figure 1:
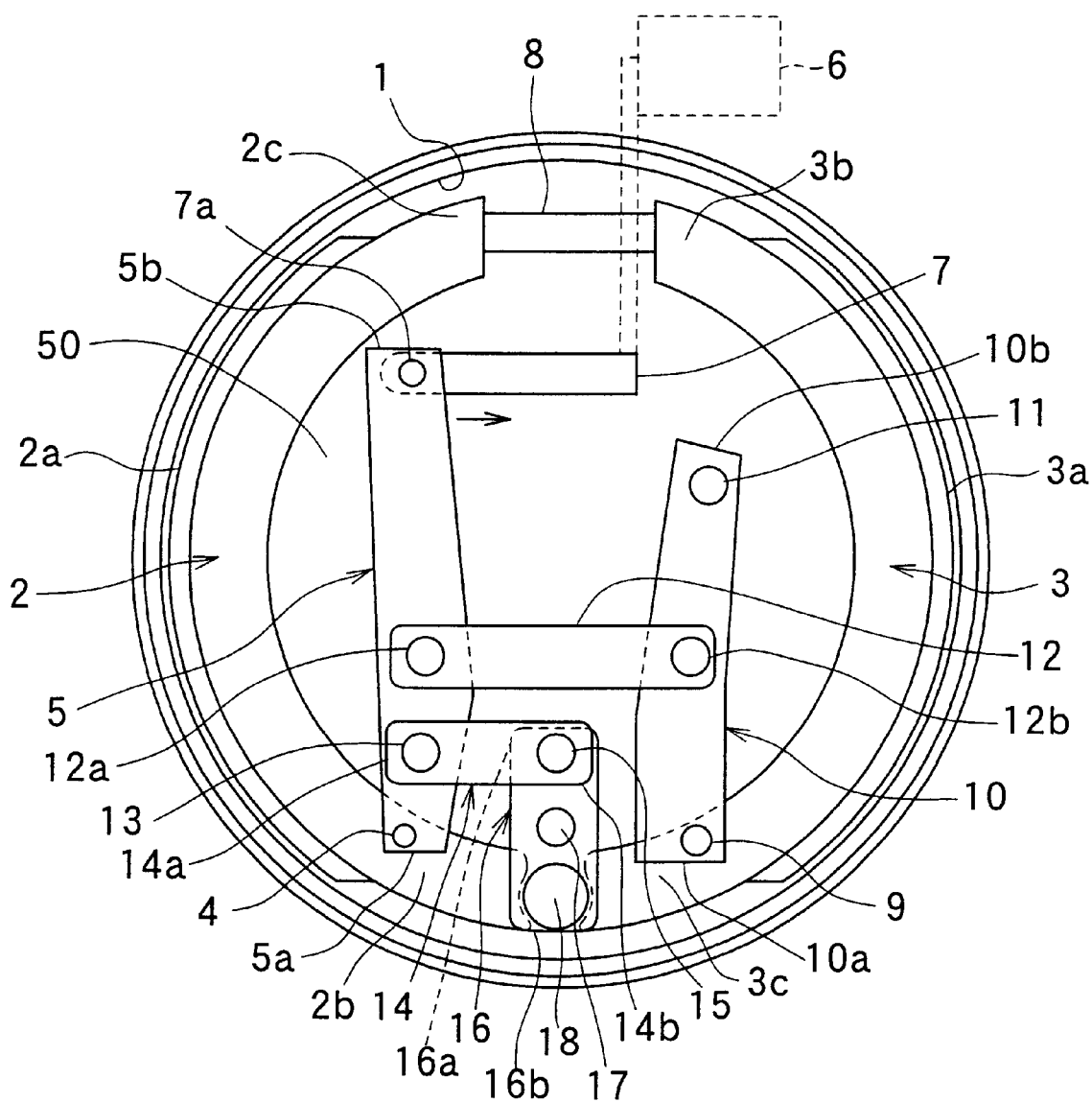
FIG. 1 shows a plan view of a drum brake device of the first preferred embodiment in accordance with the present invention.

In FIG. 1, a duo-servo type drum brake device is shown in which the first preferred embodiment in accordance with present invention is applied. This drum brake device is provided on each wheel, or the front or rear wheels of a vehicle. The configuration of the present drum brake device will hereinafter be described based on FIG. 1.

The drum brake device has a circular drum 1 and two shoes 2, 3 provided in the drum 1. The two shoes comprises a first shoe 2 and is shaped like a semi-circle and a second shoe 3. Shoes 2, 3 have contact surfaces (first contact surface, second contact surface) 2a, 3a shaped like an arc. When the contact surfaces 2a, 3a are put into contact with the drum 1, they generate friction forces between the contact surfaces 2a, 3a and the drum 1 to produce braking forces.

These two shoes are constructed as follows. When a vehicle moves forward, the first shoe 2 pushes the second shoe 3 to generate an anchor load. And, when the vehicle moves backward, the second shoe 3 pushes the first shoe 2 to generate an anchor load. Thus, when the vehicle moves forward, the first shoe 2 acts as a primary shoe and the second shoe 3 acts as a secondary shoe and when the vehicle moves backward, the second shoe acts as the primary shoe and the first shoe 2 acts as the secondary shoe.

The one end 2b of the first shoe 2 is rotatably mounted on the one end 5a of a lever (first lever) 5 with a pin 4 (and a bearing), whereby the first shoe 2 and the lever 5 can be turned each other around the pin 4. The other end of the lever 5 is rotatably mounted, via a pin 7a, on a motor output lever 7 driven by a motor 6 as a driving force generating unit. When the motor output lever 7 is driven according to the output of the motor 6, the lever 5 is pulled in the direction shown by an arrow in FIG. 1 to make the first shoe 2 apply the brakes.

On the other hand, the other end 2c of the first shoe 2 is connected to the one end of an adjuster 8 and the one end 3b of the second shoe 3 is connected to the other end of the adjuster 8. The adjuster 8 is adjustably extended or contracted and the length between the first shoe 2 and the second shoe 3 is adjusted by adjusting the length of the adjuster 8 to align the shoe 2 with the shoe 3 according to the diameter of the drum 1.

The other end 3c of the second shoe 3 is rotatably mounted on the one end 10a of a lever (second lever) 10 with a pin 9 (and a bearing), whereby the second shoe 3 and the lever 10 can be turned with respect to each other around the pin 9. The other end of the lever 10 is turnably supported by a back plate 50 via a screw 11.

Further, the middle portion between both end portions 5a, 5b of the lever 5 and the middle portion between both end portions 10a, 10b of the lever 10 are connected by a strut 12. The lever 5 and the lever 10 are connected to the strut 12 via pins 12a, 12b, whereby the lever 5 and the strut 12 can be turned with respect to each other around the pin 12a and the lever 10 and the strut 12 can be turned with respect to each other around the pin 12b. Such a configuration makes it possible for the lever 10 move in cooperation with the lever 5 via the strut 12.

Further, one end 14a of a lever (third lever) 14 is connected, via a pin 13, to the middle portion of the lever 5 between the connection portion of the lever 5 to the first shoe 2 and the connection portion of the lever 5 to the strut 12. The other end 14b of the lever 14 is connected to the one end 16a of a lever (fourth lever) 16 via a pin 15. The middle portion of the lever 16 is turnably supported by the back plate 50 via a screw 17. An anchor member 18 is mounted on the other end 16b of the lever 16. The anchor member 18 is positioned between both end portions 2b of the first shoe 2 and end portion 3c of the second shoe 3 to receive an anchor load applied to the both end portions 2b, 3c.

Figure 2:
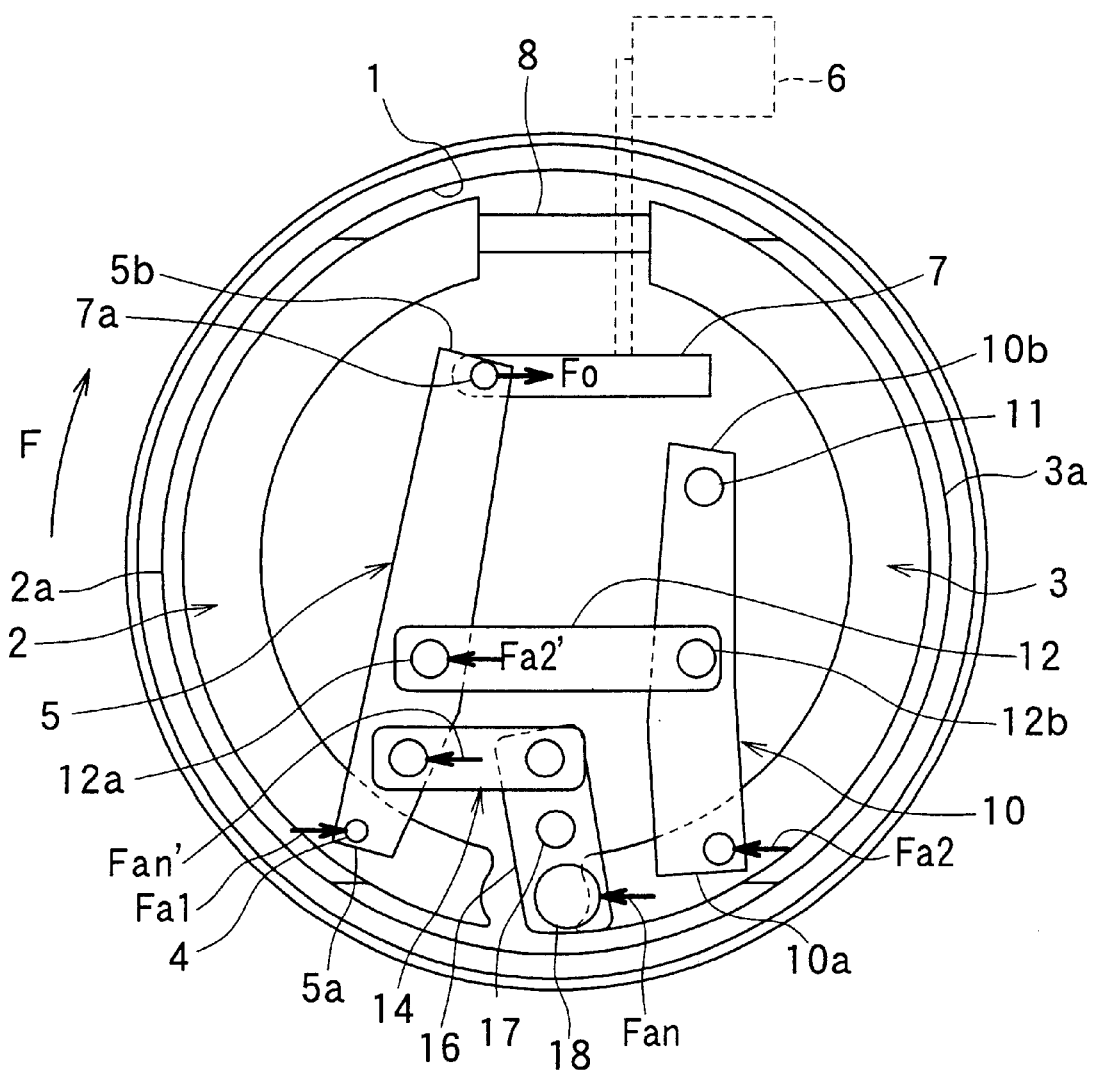
FIG. 2 is a plan view illustrating the action of the drum brake device shown in FIG. 1 when a vehicle moves forward according to the invention.
Figure 3:
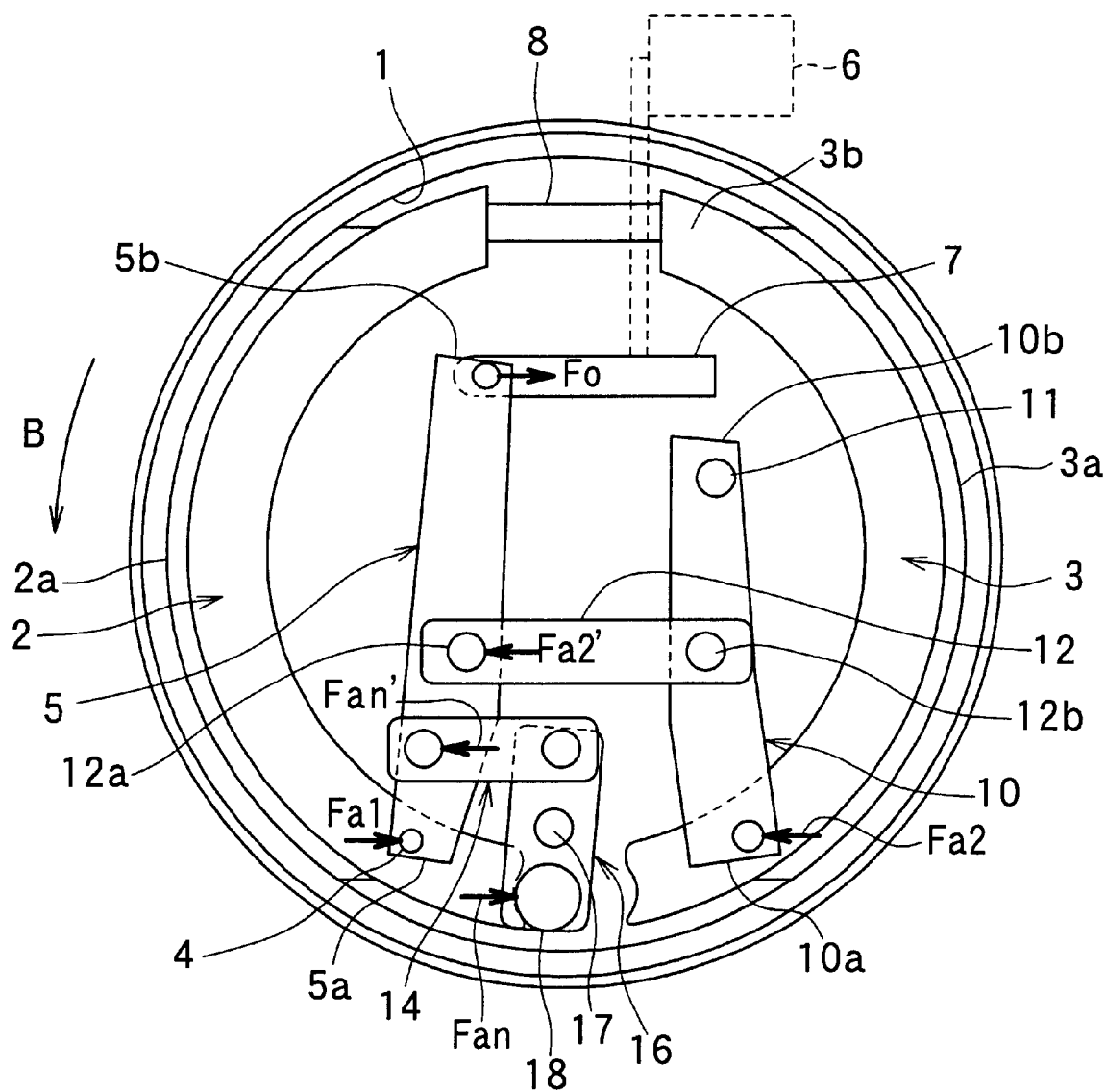
FIG. 3 is a plan view showing the action of the drum brake device shown in FIG. 1 when a vehicle moves backward according to the invention.

The action of the drum brake device having the above-mentioned configuration will be described in the following. In FIG. 2 and FIG. 3, the drum brake device is shown working when a vehicle moves forward and respectively backward. Here, while the description will be made assuming that FIG. 2 shows the state when the vehicle moves forward and FIG. 3 shows the state when the vehicle moves backward, the configuration may be made such that FIG. 3 shows the state when the vehicle moves forward and FIG. 3 shows the state when the vehicle moves backward.

(1. When a Vehicle Moves Forward)

When a vehicle moves forward, as shown in FIG. 2, the drum 1 is rotated clockwise as shown by an arrow F. In this case, when the brakes are applied, the motor output lever 7 is pulled by the motor 6, whereby the end portion 5b of the lever 5 is pulled by a force F0 to the right to apply a load Fa1 to the first shoe 2 by the end portion 5a of the lever 5 to put the contact surface 2a of the first shoe 2 into contact with the inner peripheral surface of the drum 2. At this time, the lever 5 receives a reaction force Fa1 from the first shoe 2. Contrarily, when the end portion 5b of the lever 5 is pulled to the right, the lever 10 is pressed to the right via the strut 12. Since the end portion 10b of the lever 10 is supported by the back plate 50 via a screw 11, the lever 10 is swung to the right side of the figure to apply a load to the second shoe 3 by the end portion 10a of the lever 10 to put the contact surface 3a of the second shoe 3 into contact with the inner peripheral surface of the drum 1.

When the first shoe 2 is put into contact with the drum 1, the first shoe 2 is entangled in and moved by the friction force generated by the contact surface 2a and the inner peripheral surface of the drum 1 to apply a load to the second shoe 3 via the adjuster 8. This puts the end portion 3c of the second shoe 3 into contact with the anchor member 18 to generate a friction force larger than the friction force generated by the first shoe 2 and the drum 1 between the second shoe 3 and the drum 1 by the servo action.

Further, at this time, the anchor load applied to the second shoe 3 is received by the two points of the end portion 10a of the lever 10 and the anchor member 18 to apply a load Fa2 to the lever 10 and a load Fan to the anchor member 18. This applies a force Fa2' in the left direction of the figure to the lever 5 by the strut 12 via the lever 10 and to swing the lever 16 and the anchor member 18 around the screw 17 to apply a force Fan' in the right direction of the figure to the lever 5 via the lever 14.

For this reason, the force in the left direction of the figure and the force in the right direction of the figure are applied to the lever 5, whereby the forces are adjusted to balance the moment around the connection portion of the strut 12 to the lever 5 to which the force in the left direction of the figure is applied, that is, around the pin 12a as a fulcrum. That is, the input load Fa1 applied to the first shoe 2 by the lever 5 is increased or decreased and the anchor load applied by the second shoe 3 is increased or decreased. This action controls the braking torque of the drum brake device.

Further, the magnitude of the anchor load at this time is related to the entangling force by the inner peripheral surface of the drum 1 and the entangling force varies in accordance with the coefficient of friction of the inner peripheral surface of the drum 1. Therefore, a load in accordance with the coefficient of friction of the inner peripheral surface of the drum 1 is fed back to the lever 5 via the lever 10 and the anchor member 18, whereby an input load applied to the first shoe 2 by the lever 5 is controlled.

For this reason, when the same motor driving force is applied, as the coefficient of friction is larger, the force pressing the first shoe 2 onto the drum 1 can be made smaller. Therefore, even if the coefficient of friction varies, a variation in braking force with respect to a variation in a friction force generated between the second shoe 3 and the drum 1, that is, a variation in brake effectiveness factor can be controlled.

(2. When a Vehicle Moves Backward)

When the vehicle moves backward, as shown in FIG. 3, the drum 1 is rotated counterclockwise as shown by an arrow B in the figure. In this case, when the brakes are applied, the motor output lever 7 is pulled by the motor 6, whereby an input load Fa2 is applied to the second shoe 3 by the end portion 10a of the lever 10 via the lever 5 and the strut 12 to put the contact surface 2a of the first shoe 2 into contact with the inner peripheral surface of the drum 2 and, at this time, to put the contact surface 3c of the second shoe 3 into contact with the inner peripheral surface of the drum 1, as is the case where the vehicle moves forward.

When the second shoe 3 is put into contact with the drum 1, the second shoe 3 is entangled in and moved by the friction force generated by the contact surface 3a and the inner peripheral surface of the drum 1 to apply a load to the first shoe 2 so as to press the first shoe 2 via the adjuster 8. This puts the end portion 2b of the first shoe 2 into contact with the anchor member 18 to generate a friction force larger than the friction force generated by second shoe 3 and the drum 1 between the first shoe 2 and the drum 1 by the servo action.

Further, at this time, the anchor load applied to the first shoe 2 is received by the two points of the end portion 5a of the lever 5 and the anchor member 18 to apply a load Fa1 and a load Fan to the drum 1 by the lever 5 and the anchor member 18. This applies a force Fa2' in the right direction of the figure to the lever 10 by the strut 12 via the lever 5 and to swing the lever 16 and the anchor member 18 around the screw 17 to apply a force Fan' in the left direction on the figure to the lever 5 via the lever 14.

For this reason, the force in the left direction of the figure and the force in the right direction of the figure are applied to the lever 5, whereby the forces are adjusted so as to balance moment around the connection portion of the first shoe 2 and the lever 5, that is, around the pin 4 as a fulcrum. That is, the input load applied to the second shoe 3 by the lever 10 is increased or decreased and the anchor load applied by the second shoe 3 is increased or decreased. This action controls the braking torque of the drum brake device.

Further, at the same time, since the anchor load has a magnitude responsive to the entangling force of the inner peripheral surface of the drum 1, as is the case where the vehicle moves forward, a load in accordance with the coefficient of friction of the inner peripheral surface of the drum 1 is fed back to the lever 10 via the lever 5 and the anchor member 18, whereby an input load applied to the second shoe 3 by the lever 10 is controlled.

For this reason, when the same motor driving force is applied, as the coefficient of friction is larger, the force pressing the second shoe 3 onto the drum 1 can be made smaller. Therefore, even if the coefficient of friction varies, a variation in braking force with respect to a variation in a friction force generated between the first shoe 2 and the drum 1, that is, a variation in brake effectiveness factor can be controlled.

Here, the braking torque of the drum brake device when a vehicle moves forward and when the vehicle moves backward will be studied. The braking torque Tf when the vehicle moves forward and the braking torque Tr when the vehicle moves backward are expressed by the following equations, respectively.

$$Tf = BEFf \times fm \times R \quad \text{(EQUATION 15)}$$

$$Tr = BEFr \times fm \times R \quad \text{(EQUATION 16)}$$

where BEFf is a brake effectiveness factor when a vehicle moves forward, BEFr is a brake effectiveness factor when a vehicle moves backward, and fm is a motor output load.

In this manner, since the braking torque when the vehicle moves forward and backward are expressed by the equation 15 and the equation 16, respectively, if the brake effectiveness factor BEFf when the vehicle moves forward is made equal to the brake effectiveness factor BEFr when the vehicle moves backward, in the case where the motor output load is the same value, the same braking force can be generated when the vehicle moves forward and when the vehicle moves backward. This brake effectiveness factor is calculated as follows and can be adjusted by the lever ratios of the respective levers. The method of calculating the brake effectiveness factors when the vehicle moves forward and backward will be described in the following.

(1. Brake Effectiveness Factor when a Vehicle Moves Forward)

To begin with, in order to calculate a brake effectiveness factor BEFf, three relationships of (1) balance of force of the lever 5, (2) balance of moment around a fulcrum which is the connection point of the lever 5 and the strut 12, and 3 balance of moment of the second shoe 3 will be derived. A method of deriving these three relationships will be described in the following.

(1) Balance of Force on the Lever 5

Figure 4:
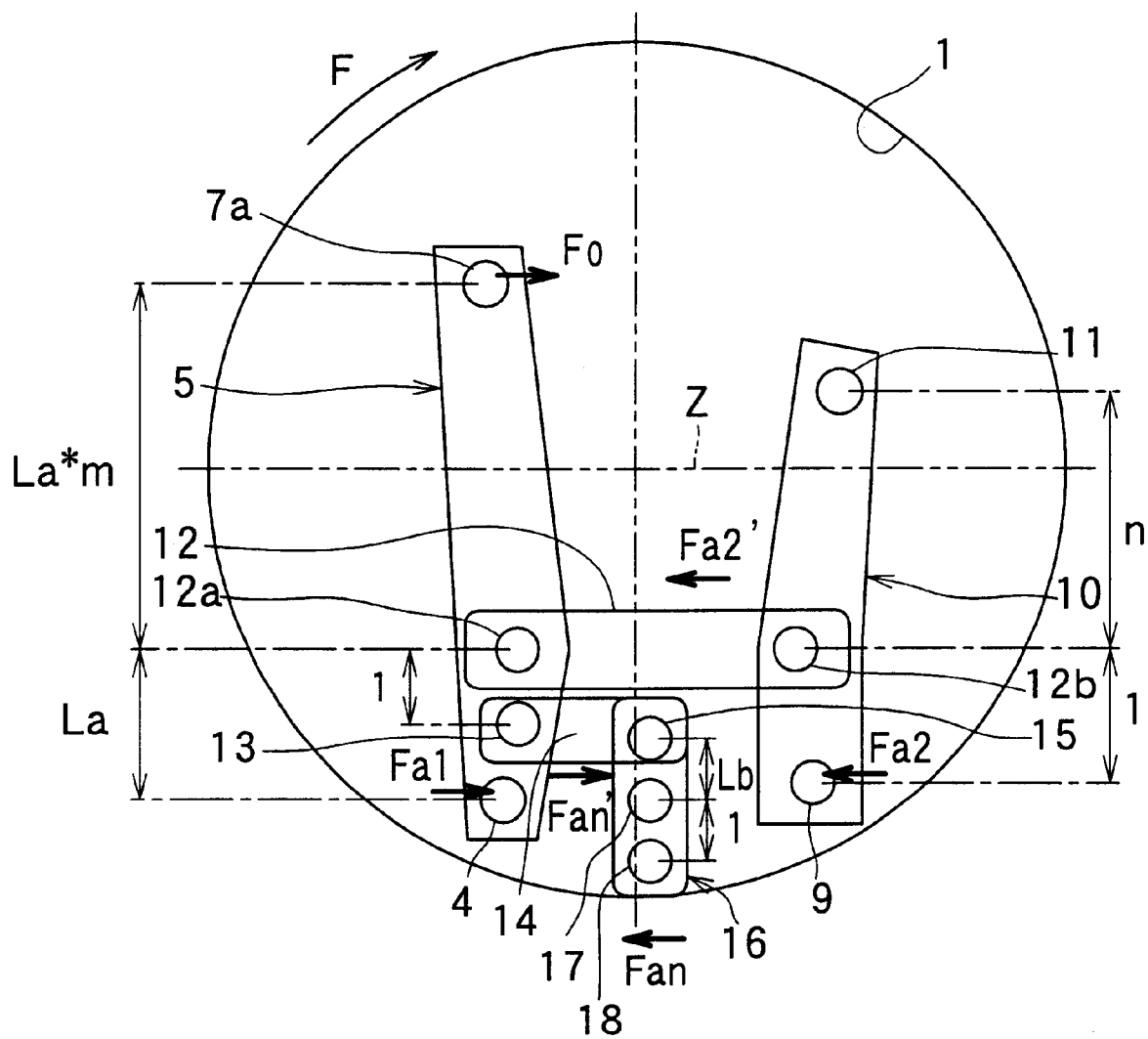
FIG. 4 is a schematic view showing parameters when a vehicle moves forward with the drum brake device shown in FIG. 1 according to the invention.

In FIG. 4, there is shown the relationship between the forces generated when the brakes are applied when the vehicle moves forward and the lever ratios of the respective levers. As shown in the FIG. 4, assuming that a force applied to the end portion 10a of the lever 10 by the anchor load of the second shoe 3 is Fa2, a force applied to the lever 5 by the strut 12 is expressed by a force Fa2' responsive to the force Fa2.

Further, letting a force applied to the anchor member 18 by the anchor load of the second shoe 3 be Fan, a force of the lever 14 pulling the lever 5 is expressed by a force Fan' responsive to the force Fan.

Still further, letting a reaction force applied to the lever 5 by pressing the first shoe 2 be Fa1 and the pulling force of the motor output lever 7 when it is driven by the motor 6 be Fo, the respective forces Fo, F1, Fan', Fa2' satisfy the equation 17 when the forces applied to the lever 5 are balanced.

$$Fa2' = Fa1 + Fan' + Fo \quad \text{(EQUATION 17)}$$

Here, since the lever ratio of the lever 10 is expressed by a ratio of a distance n from the center of the pin 12b to the center of the screw 11 when a distance from the center of the pin 12b to the center of the pin 9 is set at 1, the force Fa2' satisfies the relationship of the equation 18 with respect to the force Fa2.

$$Fa2'=(n+1)Fa2/n \qquad \text{(EQUATION 18)}$$

Further, since the lever ratio of the lever 16 is expressed by a ratio of a distance Lb from the center of the screw 17 to the center of the pin 14b when a distance from the center of the screw 17 to the center of the anchor member 18 is set at 1, the force Fan' satisfies the relationship of the equation 19 with respect to the force Fan.

$$Fan'=Fan/Lb \qquad \text{(EQUATION 19)}$$

Therefore, the following equation 20 can be obtained by these equations 17 to 19.

$$(n+1)Fa2/n=Fa1+Fan/Lb+Fo \qquad \text{(EQUATION 20)}$$

(2) Balance of Moment Around a Fulcrum

Since the pin 12a which is the connection point of the lever 5 and the strut 12 is a fulcrum, when the moments around this fulcrum are balanced, they satisfy the relationship of the equation 21.

$$Fa1 \times La + Fan' = Laxm \times Fo \qquad \text{(EQUATION 21)}$$

where La, Laxm are the lever ratios of lever 5 and correspond to a distance La from the center of the pin 4 to the center of the pin 12a and a distance Laxm from the center of the pin 12a to the pin 7a in the case where a distance from the center of the pin 12a to the center of the pin 13 is set at 1.

Then, the following equation 22 can be derived from these equations 19 to 21.

$$Fa1 \times La + Fan/Lb = Laxm \times Fo \qquad \text{(EQUATION 22)}$$

(3) Balance of Moment of the Second Shoe 3

Figure 5:
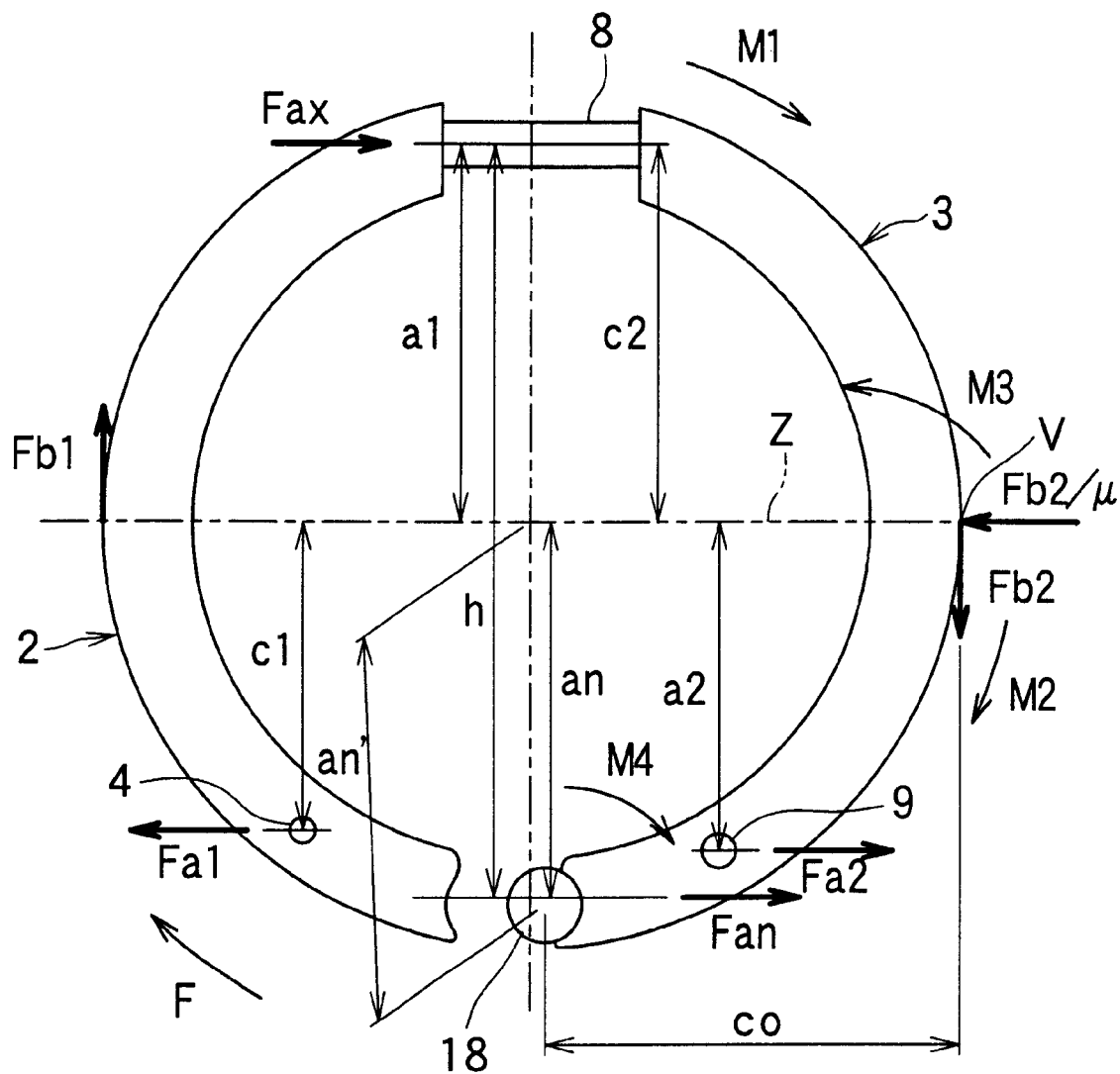
FIG. 5 is a schematic view describing parameters when a vehicle moves forward with the drum brake device shown in FIG. 1 of the invention.

In FIG. 5, there is shown the relationship between forces applied to the respective shoes 2, 3 when the brakes are applied to the vehicle when it moves forward and the distances from the center of the drum 1 and a reference line Z passing this center to the respective points to which the forces are applied. However, in order to easily get the relationship from the figure, the respective levers will be omitted.

As shown in this figure, the distance from the center of the pin 4 to the reference line Z will be expressed by c1, the distance from the connection portion of the first shoe 2 and the adjuster 8 to the reference line Z will be expressed by a1, the distance from the connection portion of the second shoe 3 and the adjuster 8 to the reference line Z will be expressed by c2, the distance from the center of the pin 9 to the reference line Z will be expressed by a2, and the distance from the center of the anchor member 18 to the reference line Z will be expressed by an. Further, the distance from the center of the anchor member 18 to the center of the drum 1 will be expressed by an' and the distance from the portion at which the first shoe 2 applies a force to the second shoe 3 via the adjuster 8 to the center of the anchor member 18 will be expressed by h. Still further, the distance from a point V where the reference line Z passes the contact surface of the drum 1 and the second shoe 3 to the center of the anchor member 18 will be expressed by co.

Further, a braking force generated on the reference line Z by the first shoe 2 and the drum 1 will be expressed by Fd1, a braking force generated by the second shoe 3 and the drum 1 will be expressed by Fd2, and a force of the first shoe 2 pressing the second shoe 3 via the adjuster 8, that is, the input load to the second shoe 3 will be expressed by Fax.

Among moments generated around the anchor member 18 are a moment M1 produced by the input load to the second shoe 3, a moment M2 produced by the braking force of the second shoe 3, a moment M3 generated by a force vertically applied to the drum 1 to generate the braking force of the second shoe 3, and a moment M4 generated by the force Fa2 applied to the second shoe 3 by the end portion 10a of the lever 10.

The moment M1 generated by the input load to the second shoe 3 is expressed by the equation 23 and the moment M2 produced by the braking force of the second shoe 3 is expressed by the equation 24.

$$M1=Fax \times h \qquad \text{(EQUATION 23)}$$

$$M2=Fd2 \times co \qquad \text{(EQUATION 24)}$$

Further, letting the coefficient of friction of the inner peripheral surface of the drum 1 be $\mu$, the moment M3 produced by the force which is vertically applied to the drum 1 to generate the braking force of the second shoe 3 is given by the following equation 25.

$$M3=Fd2 \times an/\mu \qquad \text{(EQUATION 25)}$$

Still further, since the distance from the center of the pin 9 to the center of the anchor member 18 is an–a2, the moment M4 produced by a force applied to the second shoe 3 by the end portion 10a of the lever 10 is expressed by the following equation 26.

$$M4=Fa2 \times (an-a2) \qquad \text{(EQUATION 26)}$$

Then, taking into account the directions of the respective moments, the balance of the respective moments is expressed by the following equation 27.

$$M1+M2+M4=M3 \qquad \text{(EQUATION 27)}$$

Substitution of the equations 23 to 26 into the above equation 27 yields the relationship of the following equation 28.

$$Fax \times h + Fd2 \times co + Fa2 \times (an-a2) = Fd2 \times an/\mu \qquad \text{(EQUATION 28)}$$

Since this equation includes Fa and Fax as functions, by replacing these with the input load Fa1 to the first shoe 2, three equations 20, 22, and 28 are established. The respective values (Fa, Fan, and the like) with respect to the Fa1 can be determined by solving the simultaneous equations.

Here, by arranging the equation 28 by Fd2, the following equation can be obtained.

$$Fd2=\{h \times \mu \times Fax+(an-a2) \times \mu \times Fa2\}/(an-co \times \mu) \qquad \text{(EQUATION 29)}$$

On the other hand, in the conventional duo-servo type drum brake device, it is known that the servo-ratio BF2 of the secondary shoe by the force Fax applied to the second shoe 3 by the first shoe 2 is expressed by an equation $BF2=h \times \mu/(an-co \times \mu)$. Therefore, when the equation 29 is replaced by BF2, it is expressed by the following equation 30.

$$Fd2=\{Fax+(an-a2) \times Fa2/h\} \times BF2 \qquad \text{(EQUATION 30)}$$

Further, since the input load Fax to the second shoe 3 is the anchor load of the first shoe 2 and the servo ratio BF1 of the first shoe 2 is expressed by Fd1/Fa1, it is known that the following equation 31 is established.

$$Fax/Fa1=c1/a1+BF1\times r/a1 \quad \text{(EQUATION 31)}$$

Next, a moment with respect to the center of the drum 1 will be studied. In this case, a moment produced by the force vertically applied to the drum 1 to generate the braking force of the second shoe 3 becomes zero because the line of action of the force passes the center of the drum 1. For this reason, the following equation is established by the moment produced by the respective forces applied to the second shoe 3.

$$Fax\times c2+Fd2\times r=Fan\times an'+Fa2\times a2 \quad \text{(EQUATION 32)}$$

Then, the following equation 33 can be obtained by combining these equations 30, 31, and 32.

$$(c2+r\times BF2)(c1/a1+BF1\times r/a1)\times Fa1=an'\times Fan+\{a2-BF2(an-a2)\times r/h\}\times Fa2 \quad \text{(EQUATION 33)}$$

Three equations 20, 22, and 33 can be derived in this manner.

The ratios of Fa2 and Fan with respect to Fa1 will be determined from these equations.

First, the following equation 34 can be derived from the equations 20 and 22.

$$La(1+m)\,Fa1=-(La\times m+1)Fan/Lb+La\times m(n+1)\times Fa2/n \quad \text{(EQUATION 34)}$$

Then, simplification of the equations 33 and 34 yields the following equations 35 and 36.

$$A1\times Fa1=an'\times Fan+B1\times Fa2 \quad \text{(EQUATION 35)}$$

$$A2\times Fa1=-D2\times Fan+B2\times Fa2 \quad \text{(EQUATION 36)}$$

where $A1=(C2+r\times BF2)(c1/a1+BF1\times r/a1)$, $A2=La(1+m)$, $B1=a2-BF2(an-a2)\times r/h$, $B2=La\times m(n+1)/n$, $D2=(La\times m+1)/Lb$.

Therefore, the following two equations 37 and 38 can be derived from the equations 35 and 36.

$$Fa2/Fa1=(an'\times A2+D2\times A1)/(an'\times B2+D2\times B1) \quad \text{(EQUATION 37)}$$

$$Fan/Fa1=$$

$$(A1\times B2-A2\times B1)/(an'\times B2+D2\times B1) \quad \text{(EQUATION 38)}$$

Here, since BEFf=BF1+BF2 where BEFf is the brake effectiveness factor with respect to the force Fa1 applied to the first shoe 2 when the vehicle moves forward and BF2=Fd2/Fax×Fax/Fa1, the following equation 39 is obtained by the equation 29.

$$BEFf=BF1+\{1+(an-a2)\times Fa2/Fax/h\}\times BF2\times Fax/Fa1 \quad \text{(EQUATION 39)}$$

Also, since Fa2/Fax=Fa2/Fa1×Fa1/Fax, the following equation 40 can be derived from the equation 31.

$$Fa2/Fax=Fa2/Fa1/(c1/a1+BF1\times r/a1)=(an'\times A2+D2\times A1)/(an'\times B2+D2\times B1)/(c1/a1+BF1\times r/a1) \quad \text{(EQUATION 40)}$$

Therefore, the brake effectiveness factor BEFf when the vehicle moves forward (when the input load to the first shoe 2 is Fa1) is expressed by the equation 41.

$$BEFf=BF1+\{1+(an-a2)(an'\times A2+D2\times A1)/(an'\times B2+D2\times B1)/(c1/a1+BF1\times r/a1)/h\}\times BF2\times (c1/a1+BF1\times r/a1) \quad \text{(EQUATION 41)}$$

In this manner, the brake effectiveness factor BEFf when the vehicle moves forward in the case where the input force to the first shoe 2 is assumed to be Fa1 has been determined. However, in the drum brake device of the configuration of the present preferred embodiment, the feedback load from the second shoe 3 is added to the input load to the first shoe 2. Hence, when the actual brake effectiveness factor BEFemb is calculated, it is necessary to determine the brake effectiveness factor BEFemb by the sum of the input load Fa1 at an input point to the primary shoe and the feedback load Fan'. Because Fan'=Fan/Lb/La, the sum of them is equal to Fa1+Fan/La/Lb. Therefore, to generate the same braking force that is produced when the feedback load is not applied, a force of (Fa1+Fan/La/Lb) times the input load Fa1 is required. Therefore, the actual brake effectiveness factor BEFembf of the drum brake device described in the present preferred embodiment is calculated by the following equation 42.

$$BEFembf=BEFf\times Fa1/(Fa1+Fan/La/Lb) \quad \text{(EQUATION 42)}$$

and the equation 42 is transformed into the following equation 43 by the equation 38.

$$BEFembf=BEFf/\{1+(A1\times B2-A2\times B1)/(an'\times B2+D2\times B1)/La/Lb\}\} \quad \text{(EQUATION 43)}$$

In this regard, a brake effectiveness factor BEFmo of a force Fo applied to the lever 5 by the driving force generating unit is expressed by the ratio of lever 5 as follows: BEFmo=BEFembf×m, and the equation 6 is derived.

(2. Brake Effectiveness Factor when the Vehicle Moves Backward)

Also in this case, to calculate a brake effectiveness factor BEFr, three relationships of (1) balance of force of the lever 5, (2) balance of moment around a fulcrum which is the connection point of the lever 5 and the first shoe 2, and 3 balance of moment of the second shoe 3 will be derived. A method of deriving these three relationships will be described in the following.

(1) Balance of Force of the Lever 5

Figure 6:
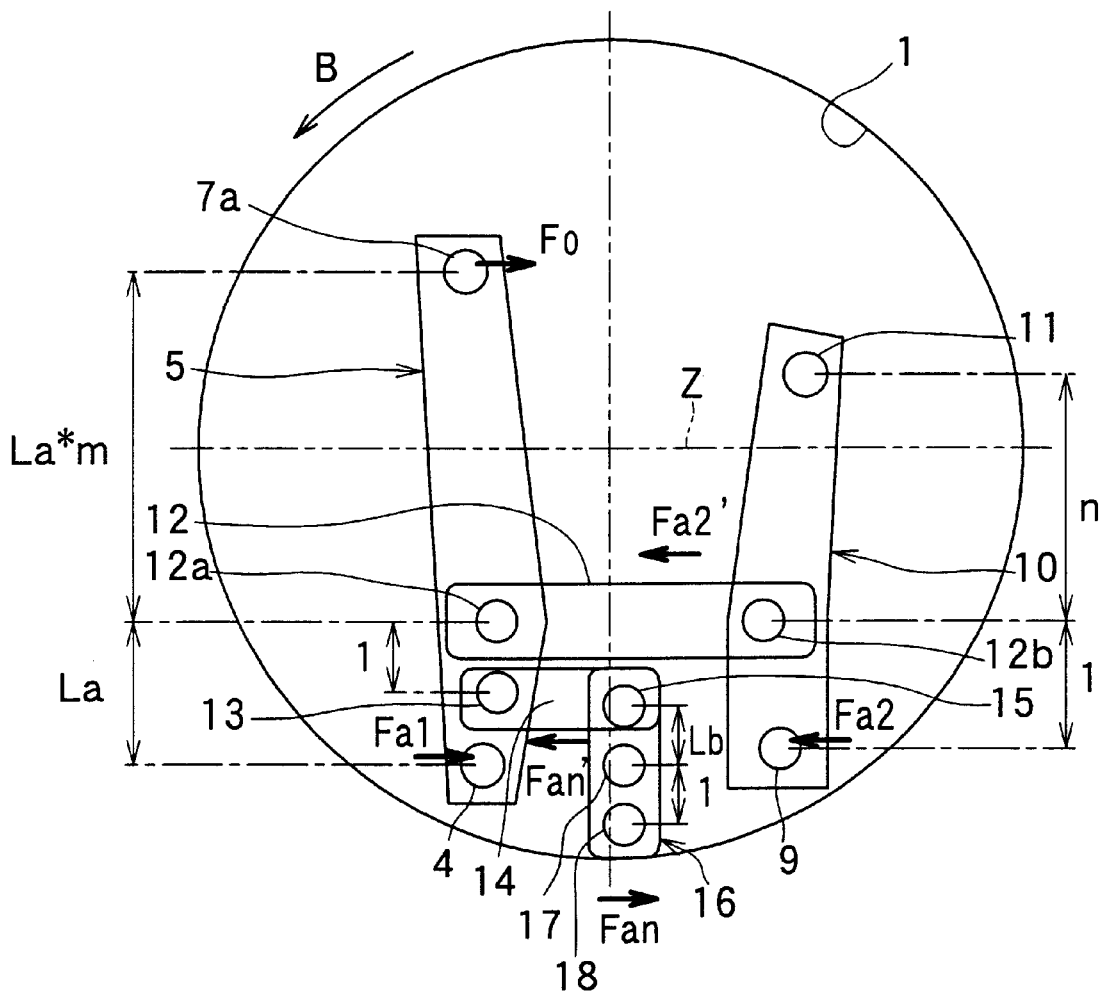
FIG. 6 is a schematic view describing parameters when a vehicle moves backward in the drum brake device shown in FIG. 1 according to the invention.

In FIG. 6, there is shown the relationships between the forces generated when the brakes are applied when the vehicle moves backward and the lever ratios of the respective levers. As shown in FIG. 6, letting a force applied to the end portion 10a of the lever 10 by the anchor load of the second show 3 be Fa2, the force applied to the lever 5 by the strut 12 is expressed by a force Fa2' responsive to the force Fa2.

Further, letting a force applied to the anchor member 18 by the anchor load of the first shoe 2 be Fan, a force of the lever 14 pressing the lever 5 is expressed by a force Fan' responsive to the force Fan.

Still further, letting a force applied to the lever 5 by the first shoe 2 be Fa1 and the pulling force of the motor output lever 7 when it is driven by the motor 6 be Fo, the respective forces Fo, F1, Fan', Fa2' satisfy the equation 44 when the forces applied to the lever 5 are balanced.

$$Fa2'+Fan'=Fa1+Fo \quad \text{(EQUATION 44)}$$

Here, since the lever ratio of the lever 10 is expressed by a ratio of a distance n from the center of the pin 12b to the center of the screw 11 when a distance from the center of the pin 12b to the center of the pin 9 is set at 1, the force Fa2' satisfies the relationship of the equation 45 with respect to the force Fa2.

$$Fa2'=(n+1)Fa2/n \quad \text{(EQUATION 45)}$$

Further, since the lever ratio of the lever 16 is expressed by a ratio of a distance Lb from the center of the screw 17 to the center of the pin 14*b* when a distance from the center of the screw 17 to the center of the anchor member 18 is set at 1, the force Fan' satisfies the relationship of the equation 46 with respect to the force Fan.

$$Fan'=Fan/Lb \qquad \text{(EQUATION 46)}$$

Therefore, the following equation 47 can be obtained by these equations 44 to 46.

$$(n+1)Fa2/n+Fan/Lb=Fa1+Fo \qquad \text{(EQUATION 47)}$$

(2) Balance of Moment Around a Fulcrum

Since the pin 4 which is the connection point of the lever 5 to the first shoe 2 is a fulcrum, when the moments around this fulcrum are balanced, they satisfy the relationship of the equation 48.

$$Fa2'\times La+Fan'(La-1)=La\times(m+1)Fo \qquad \text{(EQUATION 48)}$$

where La, La−1, La×(m+1) are the lever ratios of lever 5 and correspond to a distance La from the center of the pin 12*a* to the center of the pin 4, a distance La−1 from the center of the pin 4 to center of the pin 13, and a distance La×(m+1) from the center of pin 4 to the center of the pin 7*a* in the case where a distance from the center of the pin 12*a* to the center of the pin 13 is set at 1.

Then, the following equation 49 can be derived from these equations 46 to 48.

$$La(n+1)\times Fa2/n+Fan(La-1)/Lb=La\times(m+1)\times Fo \qquad \text{(EQUATION 49)}$$

(3) Balance of Moment of the Second Shoe 3

Figure 7:
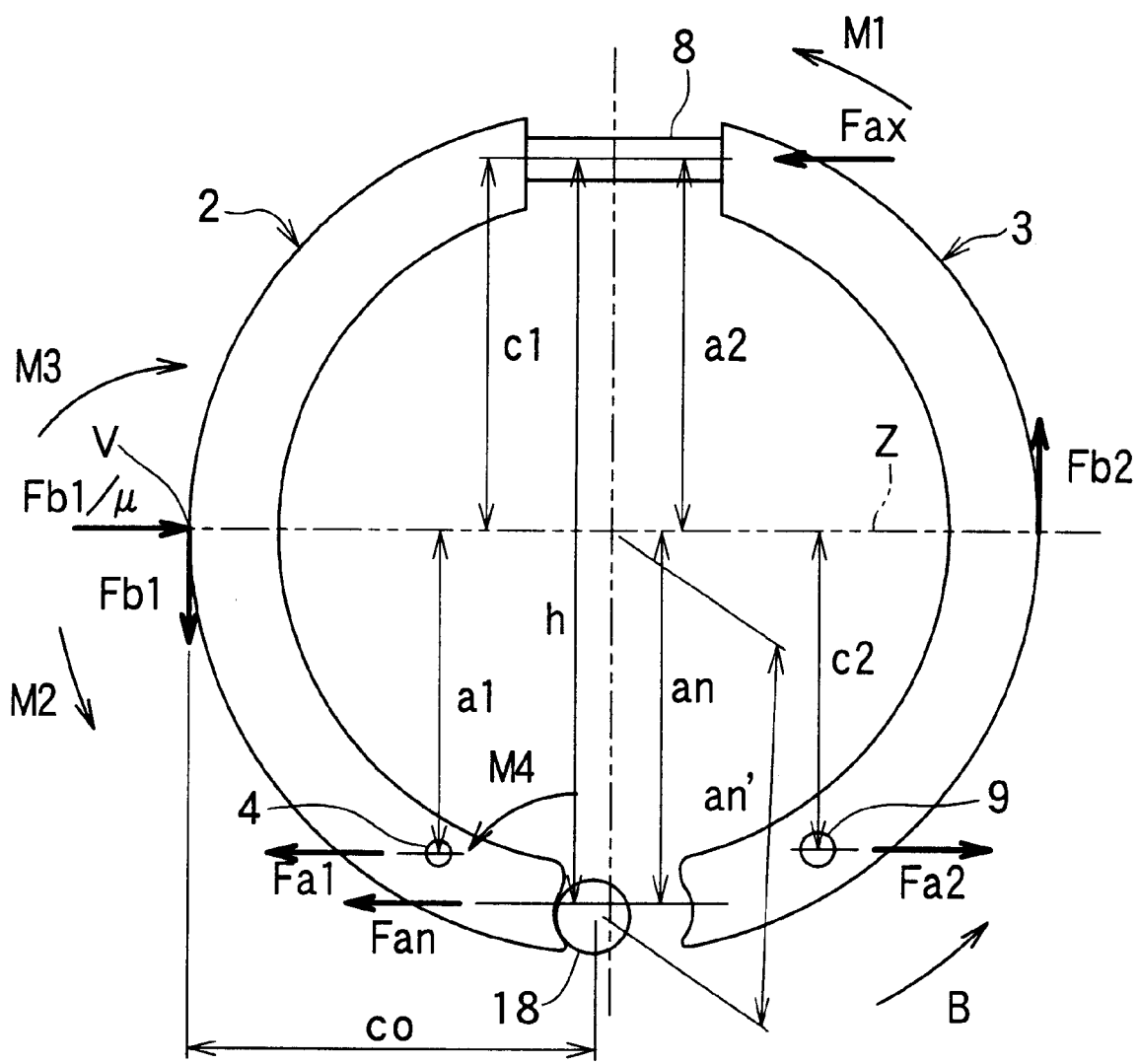
FIG. 7 is a schematic view describing parameters when a vehicle moves backward with the drum brake device shown in FIG. 1 according to the invention.

In FIG. 7, there will be shown the relationship between forces applied to the respective shoes 2, 3 when the brakes are applied to a vehicle when it moves backward and the distances from the center of the drum 1 and a reference line Z passing this center to the respective points to which the forces are applied. However, in order to easily get the relationship from the figure, the respective levers will be omitted.

As shown in this figure, the distance from the center of the pin 9 to the reference line Z will be expressed by c2, the distance from the connection portion of the second shoe 3 and the adjuster 8 to the reference line Z will be expressed by a2, the distance from the connection portion of the first shoe 2 and the adjuster 8 to the reference line Z will be expressed by c1, the distance from the center of the pin 4 to the reference line Z will be expressed by a1, and the distance from the center of the anchor member 18 to the reference line Z will be expressed by an. Further, the distance from the center of the anchor member 18 to the center of the drum 1 will be expressed by an' and the distance from the portion at which the second shoe 3 applies a force to the first shoe 2 via the adjuster 8 to the center of the anchor member 18 will be expressed by h. Still further, the distance from the point W where the reference line Z passes the contact surface of the drum 1 and the first shoe 2 to the center of the anchor member 18 will be expressed by co.

Further, a braking force generated by the first shoe 2 on the reference line Z will be expressed by Fd1, a braking force generated by the second shoe 3 will be expressed by Fd2, and a force of the second shoe 3 pressing the first shoe 2 via the adjuster 8, that is, the input load to the first shoe 2 will be expressed by Fax.

Among moments generated around the anchor member 18 are a moment M1 produced by the input load to the first shoe 2, a moment M2 produced by the braking force of the first shoe 2, a moment M3 generated by a force vertically applied to the drum 1 to generate the braking force of the first shoe 2, and a moment M4 generated by a force Fa1 applied to the first shoe 2 by the end portion 5*a* of the lever 5.

The moment M1 generated by the input load to the first shoe 2 is expressed by the equation 50 and the moment M2 produced by the braking force of the first shoe 2 is expressed by the equation 51.

$$M1=Fax\times h \qquad \text{(EQUATION 50)}$$

$$M2=Fa1\times co \qquad \text{(EQUATION 51)}$$

Further, letting the coefficient of friction of the inner peripheral surface of the drum 1 be $\mu$, the moment M3 produced by the force which is vertically applied to the drum 1 to generate the braking force of the first shoe 2 is given by the following equation 52.

$$M3=Fd1\times an/\mu \qquad \text{(EQUATION 52)}$$

Still further, since the distance from the center of the pin 4 to the center of the anchor member 18 is an−a1, the moment M4 produced by a force applied to the first shoe 2 by the end portion 5*a* of the lever 5 is expressed by the following equation 53.

$$M4=Fa1\times(an-a1) \qquad \text{(EQUATION 53)}$$

Then, taking into account the directions of the respective moments, the balance of the respective moments is expressed by the following equation 54.

$$M1+M2+M4=M3 \qquad \text{(EQUATION 54)}$$

Substitution of the equations 50 to 53 into the above equation 54 yields the relationship of the following equation 55.

$$Fax\times h+Fd1\times co+Fa1\times(an-a1)=Fd1\times an/\mu \qquad \text{(EQUATION 55)}$$

Since this equation includes Fa1 and Fax as functions, by replacing these with the input load Fa2 to the second shoe 3, three equations 47, 49 and 55 are established. The respective values (Fa, Fan, and the like) with respect to the Fa2 can be determined by solving the simultaneous equations.

Here, arranging the equation 55 by Fd1, the following equation 56 can be obtained.

$$Fd1=\{h\times\mu\times Fax+(an-a1)\times\mu\times Fa1\}/(an-co\times\mu) \qquad \text{(EQUATION 56)}$$

On the other hand, in a conventional duo-servo type drum brake device, it is known that the servo ratio BF2 of the second shoe by the force Fax applied to the first shoe 2 by the second shoe 3 is expressed by an equation BF2=h×$\mu$/(an−co×). Therefore, when the equation 56 is replaced by BF2, it is expressed by the following equation 57.

$$Fd1=\{Fax+(an-a1)\times Fa1/h\}\times BF2 \qquad \text{(EQUATION 57)}$$

Further, since the input load Fax to the first shoe 2 is the anchor load of the second shoe 3 and the servo ratio BF1 of the second shoe 3 is expressed by Fd2/Fa2, it is known that the following equation 58 is established.

$$Fax/Fa2=c2/a2+BF1\times r/a2 \qquad \text{(EQUATION 58)}$$

Next, a moment with respect to the center of the drum 1 will be studied. In this case, a moment produced by the force vertically applied to the drum 1 to generate the braking force of the first shoe 2 becomes zero because the line of action of the force passes the center of the drum 1. For this reason, the following equation is established by the moment produced by the respective forces applied to the first shoe 2.

$$Fa \times c1 + Fd1 \times r = Fan \times an' + Fa1 \times a1 \quad \text{(EQUATION 59)}$$

Then, the following equation 60 can be obtained by combining these equations 57, 58, and 59.

$$(c1 + r \times BF2)(c2/a2 + BFL \times r/a2)Fa2 = an' \times Fan + \{a1\ BF2(an - a1) \times r/h\} \times Fa1 \quad \text{(EQUATION 60)}$$

Three equations 47, 49, and 60 can be derived in this manner. The ratios of Fa1 and Fan with respect to Fa2 will be determined from these three equations.

First, the following equation 61 can be derived from the equations 47 and 49.

$$La \times m \times (n+1)Fa2/n = -(La \times m+1)Fan/Lb + La \times (m+1) \times Fa1 \quad \text{(EQUATION 61)}$$

Then, simplification of the equations 60 and 61 yields the following equations 62 and 63.

$$A1 \times Fa2 = an' \times Fan + B1 \times Fa1 \quad \text{(EQUATION 62)}$$

$$A2 \times Fa2 = -D2 \times Fan + B2 \times Fa1 \quad \text{(EQUATION 63)}$$

where $A1=(C1+r \times BF2)(c2/a2+BF1 \times r/a2)$, $A2=La \times m \times (n+1)/n$, $B1=\{a1-BF2(an-a1) \times r/h\}$, $B2=La \times (m+1)$, $D2=(La \times m+1)/Lb$.

Therefore, the following two equations 64 and 65 can be derived from the equations 62 and 64.

$$Fa1/Fa2 = (an' \times A2 + D2 \times A1)/(an' \times B2 + D2 \times B1) \quad \text{(EQUATION 64)}$$

$$Fan/Fa2 = (A1 \times B2 - A2 \times B1)/(an' \times B2 + D2 \times B1) \quad \text{(EQUATION 65)}$$

Here, since BEFfr=BF1+BF2 where BEFfr is the brake effectiveness factor when the vehicle moves backward and BEFr=BF1+{1+(an'−a1)Fa1/Fax/h}×BF2×Fax/Fa2, the following equation 66 is obtained from the equation 56.

$$Fa1/Fax = Fa1/Fa2/(c2/a2+BF1 \times r/a2) = (an' \times A2 + D2 \times A1)/(an' \times B2 + D2 \times B1)/(c2/a2 + BF1 \times r/a2) \quad \text{(EQUATION 66)}$$

Therefore, the brake effectiveness factor BEFr with respect to the force Fa2 applied to the second shoe 3 when the vehicle moves backward is expressed by the equation 67.

$$BEFr = BF1 + \{1 + (an-a1)(an' \times A2 + D2 \times A1)/(an' \times B2 + D2 \times B1)/(c2/a2 + BF1 \times r/a2)/h\} \times BF2 \times (c2/a2 + BF1 \times r/a2) \quad \text{(EQUATION 67)}$$

In this manner, the brake effectiveness factor BEFr when the vehicle moves backward in the case where the input force to the second shoe 3 is assumed to be Fa2 has been determined. However, in the drum brake device of the configuration of the present preferred embodiment, the feedback load from the first shoe 2 is added to the input load to the second shoe 3. Hence, when the actual brake effectiveness factor BEFembr is calculated, it is necessary to determine the brake effectiveness factor BEFembr by the sum of the input load Fa2 at an input point to the primary shoe and the feedback load Fan'. Because Fan'=Fan(La−1)n/La/(n+1)/Lb, the sum of them is equal to Fa2+Fan (La−1)n/La/(n+1)/Lb. Therefore, to generate the same braking force that is produced when the feedback load is not applied, a force of {Fa2+Fan(La−1)n/La/(n+1)/Lb}Fa2 times the input load Fa1 is required. Therefore, the actual brake effectiveness factor BEFembr of the drum brake device described in the present preferred embodiment is calculated by the following equation 68.

$$BEFembr = BEFr \times Fa2/\{Fa2 + Fan(La-1)n/La/(n+1)/Lb\} \quad \text{(EQUATION 68)}$$

and the equation 68 is transformed into the following equation 69 by the equation 65.

$$BEFembr = BEFr/\{1 + (A1 \times B2 - A2 \times B1)/(La-1)n/(an' \times B2 + D2 \times B1)/La/(n+1)/Lb\} \quad \text{(EQUATION 69)}$$

In this regard, a brake effectiveness factor BEFmo with respect to a force Fo applied to the lever 5 by the driving force generating unit is expressed by the lever ratio of lever 5 and the lever ratio of the lever 10 as follows: BEFmor=BEFembr×n (m+1)/(n+1) and the equation 12 is derived.

As described above, since the calculating equations of the brake effectiveness factors BEFf and BEFr are expressed by the equation 43 and the equation 69, it is possible to adjust the effectiveness of the brakes when the vehicle moves forward and backward.

Further, it is possible to produce the same braking force when the vehicle moves forward and backward by equalizing the brake effectiveness factor BEFembf when the vehicle moves forward to the brake effectiveness factor BEFembr when the vehicle moves backward.

Further, as shown in the present preferred embodiment, it is possible to produce the braking force by pulling the motor output lever 7 in the same direction by the same motor output, that is, by the motor 6 when the vehicle moves forward and backward. Still further, in the case where the brake pedal is released after the vehicle is stopped when the vehicle is moving up an up-slope, the vehicle is going to move down the slope. In this case, since the rotational direction of the drum 1 is reverse to the direction when the vehicle is moving, it is necessary to reverse the direction of the rotation of the motor. However, the configuration of the present preferred embodiment can eliminate the necessity of reversing the direction of the rotation of the motor.

Second Preferred Embodiment

Figure 8:
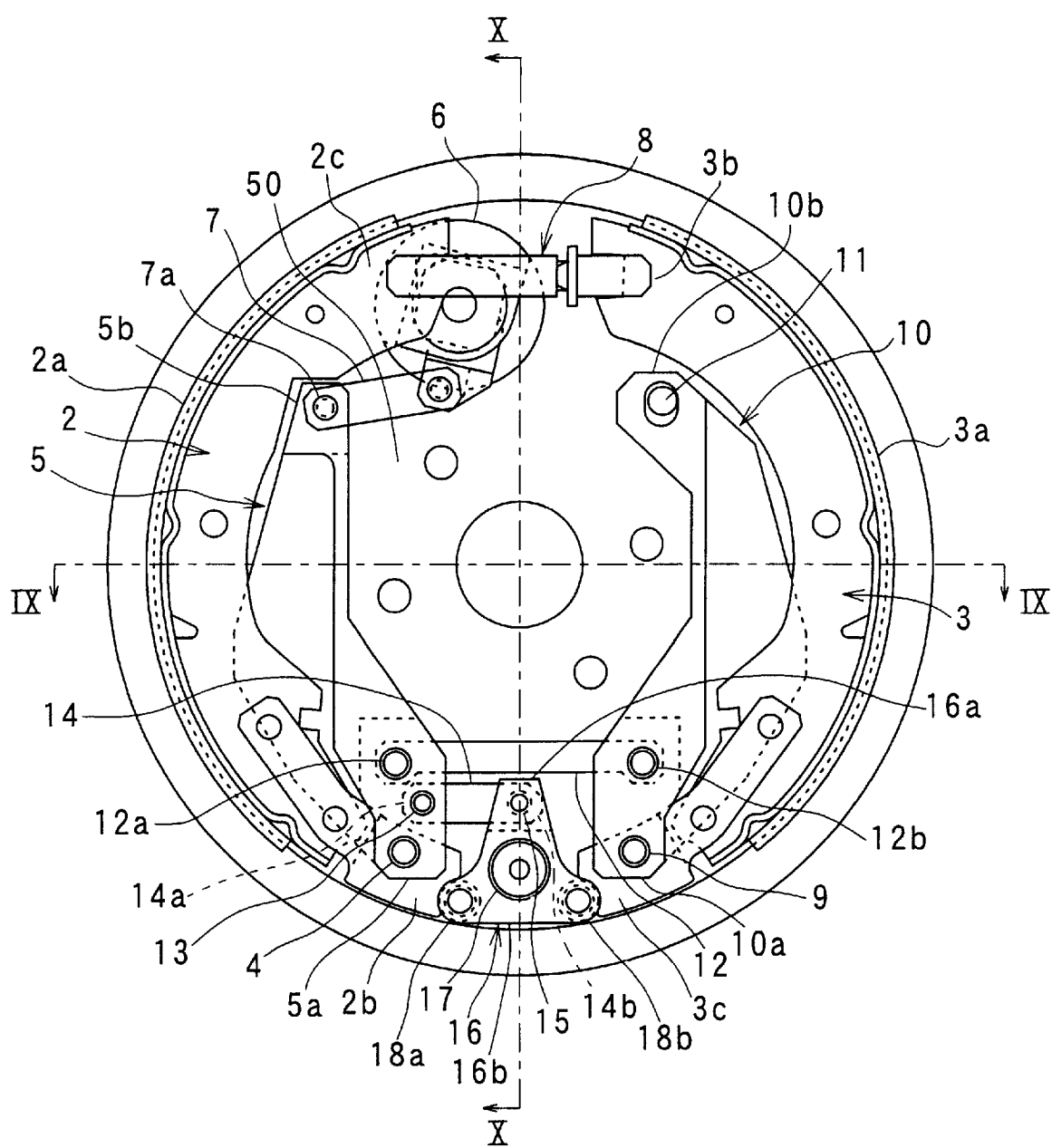
FIG. 8 is a schematic view of a drum brake device of a second preferred embodiment in accordance with the present invention.

The front view of the drum brake device in the second preferred embodiment in accordance with the present invention will be shown in FIG. 8. Further, the cross-sectional views taken on a line IX—IX and a line X—X in FIG. 8 will be shown in FIG. 9 and FIG. 10. The configuration of the drum brake device in the present preferred embodiment will be described based on these figures. Here, since the basic configuration of the drum brake device shown in the present preferred embodiment is the same as the that of the first preferred embodiment, like symbols in FIG. 1 are attached to like configurations and the description thereof will be omitted.

In the construction of the brake shown in FIG. 8, in order to make use of the mechanical feedback mechanism of a braking torque, it is necessary to eliminate the hysteresis of the braking torque with respect to torque generated by a driving unit (corresponding to a rotation driving unit 31 described below). In order to eliminate such a hysteresis, it is necessary to improve the transfer efficiency of force of a link mechanism and a speed reducing mechanism as much as possible. The present preferred embodiment is intended to improve the transfer efficiency of force of the link mechanism and the speed reducing mechanism like this as compared with the first preferred embodiment.

Figure 9:
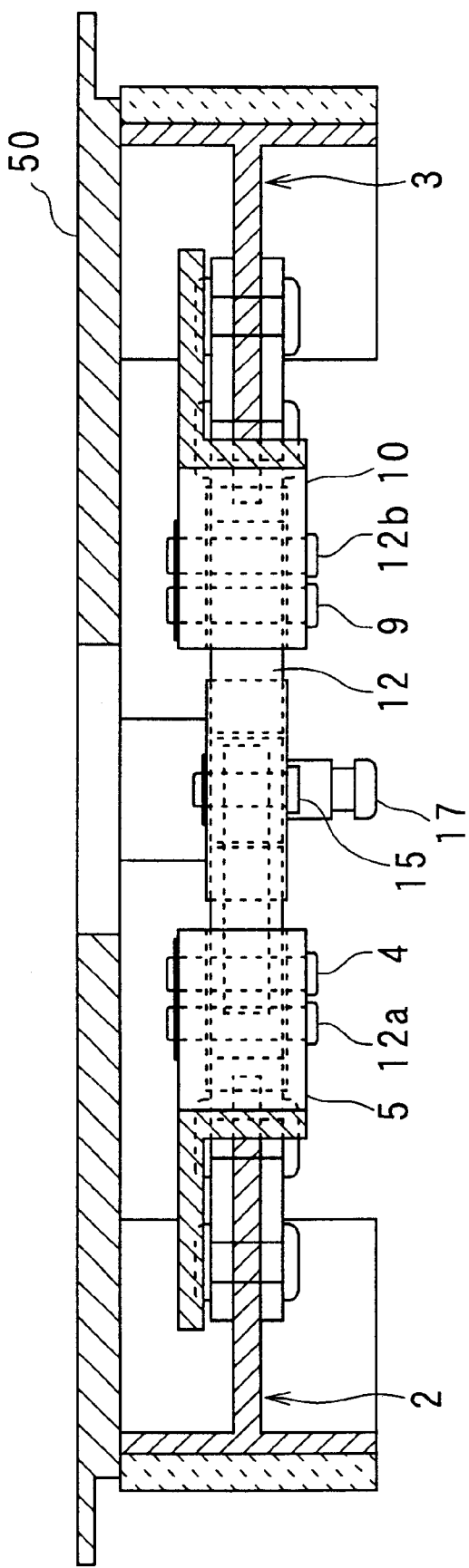
FIG. 9 is a cross-sectional view taken on a line IX—IX of the drum brake device shown in FIG. 8.

First, a link mechanism in the present preferred embodiment will be described. The present preferred embodiment has a structure in which the load transferring portions of the respective elements constituting the link mechanism are arranged on the same plane perpendicular to an axle (the same plane perpendicular to the central axis of the drum), as shown in FIG. 9. For example, the load transferring portions in a pin 4 for connecting the first shoe 2 to a lever 5, a pin 12*a* for connecting the lever 5 to a strut 12, a pin 15 for connecting a lever 14 to a lever 16, a screw 17 for supporting the lever 16 with a back plate 50, a pin 9 for connecting the second shoe 3 to a lever 10, and a pin 12b for connecting the lever 10 to the strut 12 are arranged on the same plane.

This configuration makes it possible to transfer the load on the same plane by the link mechanism to thereby improve the transfer efficiency of the load (force) and to prevent the hysteresis described above.

Figure 10:
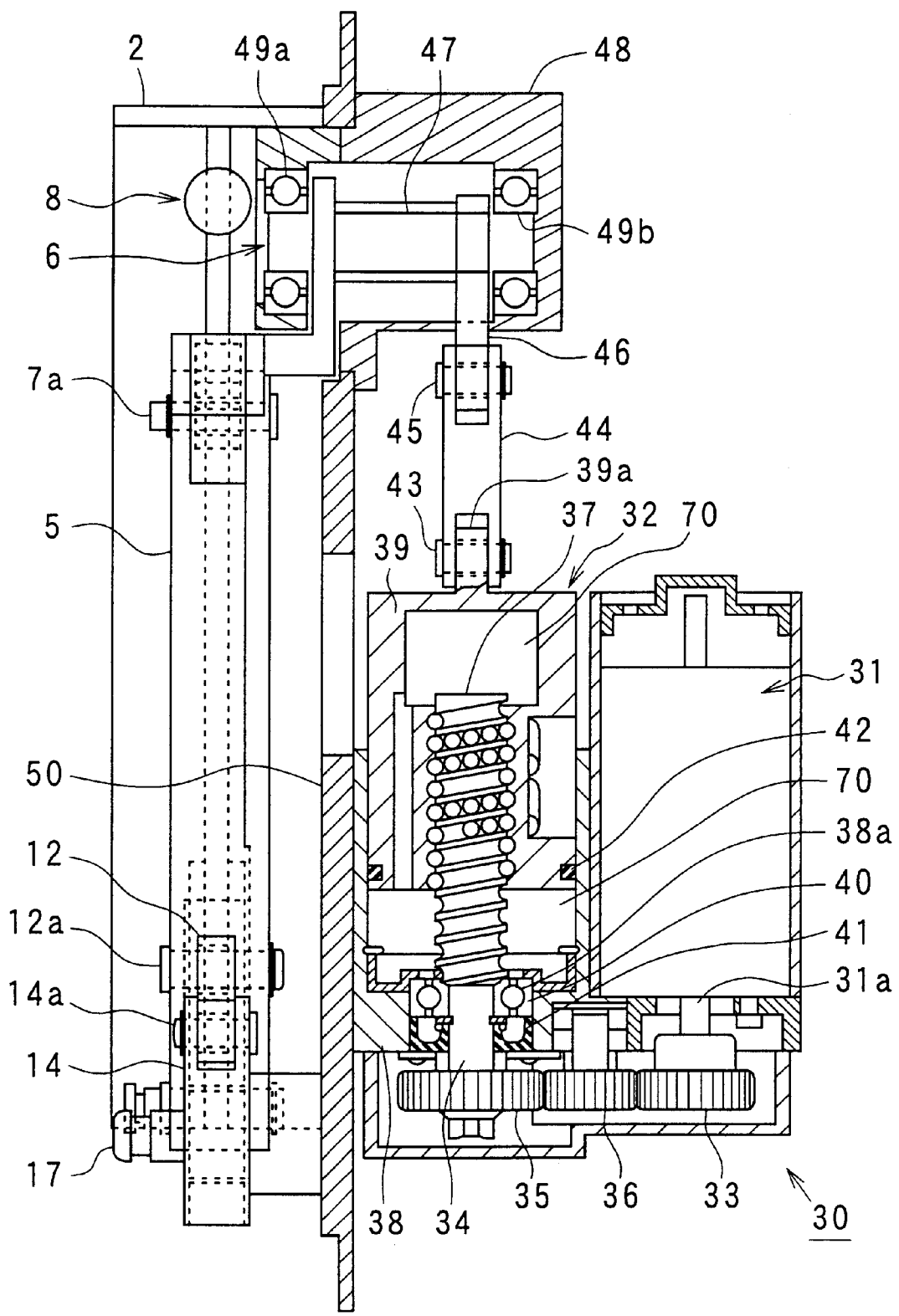
FIG. 10 is a cross-sectional view taken on a line X—X of the drum brake device shown in FIG. 8.

Sequentially, a speed reducing mechanism 30 in the present preferred embodiment will be described with reference to FIG. 10. As shown in FIG. 10, the speed reducing mechanism 30 is arranged at the back side of the back plate 50 and reduces the rotary power of a rotation driving unit 31 at a predetermined reduction ratio to output it as the driving force of a motor 6.

The speed reducing mechanism 30 is provided with the rotation driving unit 31 and a ball screw mechanism (ball screw) 32. The driving force of the rotation driving unit 31 is transferred to the ball screw mechanism 32 via a first gear 33 fixed to the shaft 31a of the rotation driving unit 31, a second gear 35 fixed to the screw shaft support portion 34 of the ball screw mechanism 32, a third gear 36 interposed between the first gear 33 and the second gear 35.

The ball screw mechanism 32 is provided with a screw shaft portion 37 coaxial with the screw shaft support portion 34, a hollow housing 38 for receiving the screw shaft support portion 34 and the screw shaft portion 37, a nut portion 39 surrounding the outer periphery of the screw shaft portion 37 and having a screw groove 50a in which balls 60 provided on the screw shaft portion 37 can move, and a bearing 40 for supporting the screw shaft support portion 37 disposed in a hole 38a made in the housing 38. Further, a space constituted by the housing 38 and a piston portion 39 is filled with lubricating oil or grease 70. The lubricating oil or the grease 70 is prevented from leaking outside the housing 38 by a sealing member 41 provided at the outer side of the bearing 40 in the hollow space of the hole 38a of the housing 38 and a sealing ring 42 provided on the outer peripheral surface of the piston portion 39.

In these constituents, when the screw shaft support portion 34 and the screw shaft portion 37 are turned by the driving force of the rotation driving unit 31 via the first to third gears 33, 35, 36, the piston portion 39 is slid in the hollow space of the housing 38 in the axial direction of the screw shaft portion 37. The grease 70 is prevented from leaking outside the housing 38 by the sealing member 41 and lubricates the screw shaft portion 37.

Further, a connecting portion 39a is provided at the tip end of the nut portion 39. To the connection portion 39a is rotatably connected one end of a lever 44 via a pin 43. The other end of the lever 44 is rotatably connected to an arm 46 provided on a shaft 47 of a motor 6 via a pin 45. Here, the shaft 47 of the motor 6 is received in a case 48 fixed to a back plate and is supported by two bearings 49a, 49b fixed in the case 48.

Figure 11:
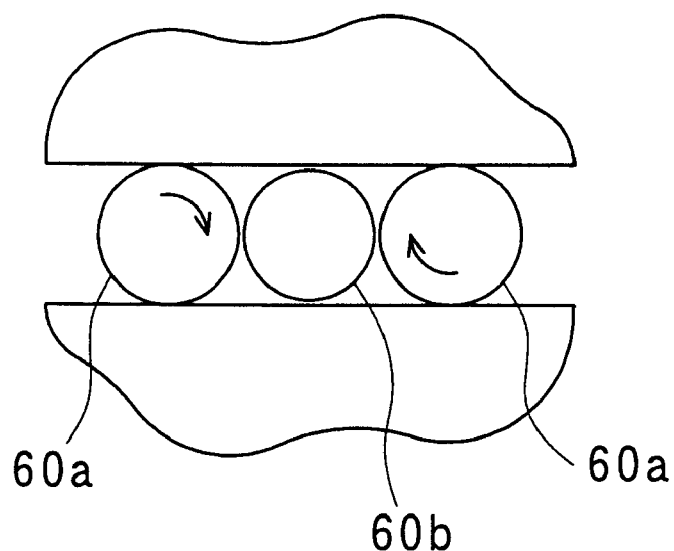
FIG. 11 is a partially enlarged side view of a screw shaft portion shown in FIG. 8.

In the speed reducing mechanism 30 having such a configuration, the driving portion of the ball screw mechanism 32 has the following configuration. In FIG. 11 is shown an enlarged side view of the driving portion of the ball screw mechanism 32 and the structure of the driving portion of the ball screw mechanism 32 will be described.

A plurality of balls 60 are arranged in the screw groove of the screw shaft portion 37. However, if the plurality of balls 60 are same in size, neighboring balls 60 are put into contact with each other to generate sliding friction, whereby the nut portion 39 can not be stably driven by the screw shaft portion 37. For this reason, in the present preferred embodiment, the balls 60 are divided into at least two sizes: large size balls (driving ball) 60a which contact the screw groove of the screw shaft portion 37 and the screw groove of the nut portion 39 and small size balls (spacer ball) 60b which are separated from at least one of the screw groove of the screw shaft portion 37 and the screw groove of the nut portion 39. The small size balls 60b are disposed between the large size balls 60a.

This configuration prevents the large size balls from contacting each other and reduce a sliding resistance between the balls 60. Accordingly, this improves the transfer efficiency of force of the speed reducing mechanism to prevent the hysteresis described above.

Further, in the present preferred embodiment, the ball screw mechanism 32 is provided with a plurality of circuits of screw grooves in the axial direction of the screw shaft portion 37. Accordingly, this can elongate the effective screw shaft length with respect to the shaft diameter of the screw shaft portion 37 to prevent the ball screw from tilting. For this reason, this ball screw mechanism 32 can improve the transfer efficiency of force of the speed reducing mechanism to prevent the hysteresis described above.

As described above, in the present preferred embodiment, since the load transfer parts of the link mechanism provided in the drum brake device are arranged on the same plane, it is possible to improve the transfer efficiency of force by the link mechanism.

Further, in the speed reducing mechanism 30, the sliding resistance of the large balls 60a is reduced by the contact preventing members, and the ball screw mechanism 32 is smoothly driven by preventing the leak of the lubricating oil by the sealing member 41. The ball screw mechanism 32 is prevented from tilting by the plurality of circuits of screw grooves. This can improve the transfer efficiency of force of the speed reducing mechanism 30.

Therefore, this can improve the transfer efficiency of force of the link mechanism and the speed reducing mechanism 30 to almost eliminate the hysteresis of the braking torque with respect to torque generated by the rotation driving unit 31, which makes it possible to make more use of the mechanical feedback of the braking torque.

Other Preferred Embodiments

In the preferred embodiment described above, the first shoe 2 is connected to the end portion 5a of the lever 5 by the pin 4. But, if the load of the lever 5 is applied to the first shoe 2, they are not necessarily connected to each other by the pin 4. For example, the first shoe 2 may be provided with a receiving portion which has a depression or the like for receiving the load of the lever 5. Further, the second shoe 3 is connected to the end portion 10a of the lever 10 by the pin 9, but also in this case, if the second shoe is provided with a receiving portion or the like, they are not necessarily connected each other by the pin 9.

Further, the present preferred embodiment has been described for a case in which the same braking force is applied when a vehicle moves forward and when it moves backward. But, the same braking force is not necessarily applied. For example, the braking force when the vehicle moves forward may be lager than when the vehicle moves backward. Still further, while the transfer efficiency of force is improved in both the link mechanism and the speed reducing mechanism in the second preferred embodiment, it is possible to produce the above-mentioned effect by improving the transfer efficiency of force in at least one of them.

Figure 12:
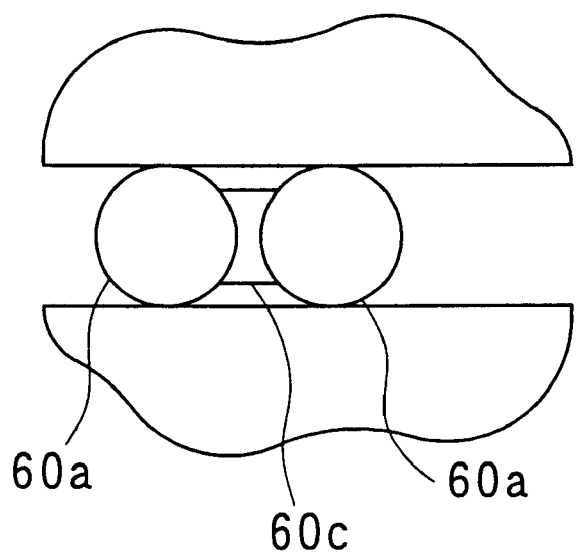
FIG. 12 is a partially enlarged side view of a screw shaft portion described in another preferred embodiment.

Still further, in the second preferred embodiment, the small size balls 60b are disposed between the large size balls 60a and function as contact preventing members of the large size balls 60a. However, other contact preventing members may be used. For example, as shown in FIG. 12, it is also recommended that a retainer 60c, shaped like a drum in cross section, be disposed between the respective balls 60a and be used as the contact preventing member.

While the present invention has been described in connection with the preferred embodiments, it will be understood that the present invention is not limited thereto. On the contrary, the present invention is intended to cover all alternatives, modifications, and equivalents which may be included within the spirit and scope of the present invention, as set forth in the following claims.

While the above-described embodiments refer to examples of usage of the present invention, it is understood that the present invention may be applied to other usage, modifications and variations of the same, and is not limited to the disclosure provided herein.

What is claimed is:

1. A drum brake device comprising:
   a driving force generating unit for generating a driving force responsive to an application of brakes to a vehicle;
   a first shoe having a first contact surface 2a proximate an inner peripheral surface of a rotary drum and being moved to contact the inner peripheral surface of the drum based on the driving force generated by the driving force generating unit;
   a second shoe having a second contact surface 3a proximate the inner peripheral surface of the drum and being moved in connection with the first shoe;
   a first lever having a contact portion that contacts with the first shoe and applies a load in a direction toward the inner peripheral surface of the drum to the first shoe based on the driving force of the driving force generating unit;
   a second lever having a contact portion that contacts with the second shoe and applies a load in the direction toward the inner peripheral surface of the drum to the second shoe based on the driving force of the driving force generating unit;
   a strut connected to the first lever and the second lever to connect the first lever to the second lever;
   an anchor member for receiving an anchor load generated by the first shoe or the second shoe; and
   a third lever connected to a portion of the first lever between the connection portion of the first lever to the strut and the contact portion of the first lever with the first shoe, said third lever feeding back a load applied to the anchor member to the first lever.

2. A drum brake device according to claim 1, wherein the first and second contact surfaces contact the inner peripheral surface of the drum and the second shoe is pressed by the first shoe to generate an anchor load that is applied to two portions of the contact portion of the second lever with the second shoe and the anchor member if the brakes are applied when the drum is rotated in a first direction F, and wherein the first and second contact surfaces contact the inner peripheral surface of the drum and the first shoe is pressed by the second shoe to generate an anchor load which is applied to two portions of the contact portion of the first lever with the first shoe and the anchor member if the brakes are applied when the drum is rotated in a second direction B.

3. A drum brake device according to claim 2, wherein the third lever receives a load applied to the anchor member to apply a load to the first lever in a direction that reduces the load to the first shoe by the first lever when the brakes are applied when the drum is rotated in the first direction, wherein the third lever receives a load applied to the anchor member to apply a load to the first lever in a direction to increase the load applied to the first shoe when the brakes are applied when the drum is rotated in the second direction.

4. A drum brake device according to claim 1, further comprising a fourth lever which swings around a predetermined portion and has an anchor member arranged at one side of the predetermined portion and is connected to the third lever at another side of the predetermined portion.

5. A drum brake device according to claim 1, wherein the end portion of the first lever which is opposite to the contact portion with the first shoe across the connection portion thereof to the strut is connected to an output lever to which the driving force of the driving force generating unit is outputted.

6. A drum brake device according to claim 1, wherein the second lever swings around the end portion of the second lever which is opposite to the contact portion thereof with the second shoe across the connection portion thereof to the strut.

7. A drum brake device according to claim 1, wherein transfer portions of force by a link mechanism including the first shoe, the second shoe, the first lever, the second lever, the third lever and the strut are arranged on a same plane perpendicular to an axle.

8. A drum brake device according to claim 1, wherein transfer portions of the respective forces in the contact portion of the first shoe with the first lever, the connecting portion of the first lever to the strut, the contact portion of the second shoe with the second lever, and the contact portion of the second lever with the strut are arranged on the same plane perpendicular to an axle.

9. A drum brake device according to claim 1, further comprising:
   a rotation driving unit for generating a rotational driving force responsive to a request for the application of brakes to the vehicle;
   a ball screw having a screw shaft portion which is driven by the rotation driving unit and has a screw groove and a plurality of driving balls in the screw groove and a nut portion which surrounds an outer periphery of the screw shaft portion and has a screw groove in which the driving balls can move; and
   a speed reducing mechanism in which the driving balls are arranged so that they contact both the screw grooves of the screw shaft portion and the nut portion and the nut portion is moved in the axial direction of the screw shaft portion as the screw shaft portion is rotated;
   wherein the driving force generating unit generates the driving force via the speed reducing mechanism; and
   wherein contact preventing members, for preventing the driving balls from contacting each other are disposed between the plurality of driving balls of the ball screw provided in the speed reducing mechanism.

10. A drum brake device according to claim 9, wherein the contact preventing member is a spacer ball smaller than the driving ball.

11. A drum brake device according to claim 9, wherein the contact preventing member is a retainer shaped as a drum in cross section.

12. A drum brake device according to claim 9, wherein the number of the screw grooves having driving balls in the ball screw is plural.

13. A drum brake device according to claim 9, wherein the speed reducing mechanism has a hollow housing in which a screw shaft support portion for driving the screw shaft portion and the nut portion can slide and which has a hole through which the screw shaft support portion is arranged, a bearing which is disposed in the hole of the housing and supports the screw shaft support portion, a space formed by the housing and the nut portion being reserved for lubricating oil or grease, and a sealing member which is provided outside the portion where the bearing is disposed in the space of the hole of the housing.

14. A drum brake device comprising:

a driving force generating unit for generating a driving force responsive to application of brakes to a vehicle;

a first shoe having a first contact surface proximate the inner peripheral surface of a rotary drum and being moved to contact the inner peripheral surface of the drum based on the driving force generated by the driving force generating unit;

a second shoe having a second contact surface $3a$ proximate the inner peripheral surface of the drum and being moved in connection with the first shoe;

a first lever having a contact portion with the first shoe and applying a load on the first shoe toward the inner peripheral surface of the drum based on a driving force of the driving force generating unit;

a second lever having a contact portion with the second shoe and applying a load to the second shoe toward an inner peripheral surface of the drum based on a driving force of the driving force generating unit;

a strut connecting the first lever and the second lever;

an anchor member for receiving an anchor load generated by the first shoe or the second shoe;

a third lever connected to a portion of the first lever between the connection portion of the first lever with the strut and the contact portion 4 of the first lever with the first shoe to feed back the load applied to the anchor member to the first lever; and a fourth lever which swings around a predetermined portion and has the anchor member disposed at one side of the predetermined portion and is connected to the third lever at another side of the predetermined portion;

wherein the second lever swings around the support end portion of the second lever which is opposite to the contact portion thereof with the second shoe across the connection portion thereof to the strut;

wherein the end portion of the first lever which is opposite to the contact portion with the first shoe across the connection portion to the strut is connected to an output lever to which the driving force of the driving force generating unit is output;

wherein a distance from a center of the connection portion of the first lever with the strut to a center of the connection portion of the first lever with the third lever is w1, a distance from a center of the connection portion of the first lever with the strut to the contact portion of the first lever with the first shoe is expressed by La, and a distance from a center of the connection portion of the first lever with the strut to a center of the connection portion of the first lever with the output lever is expressed by La×m;

wherein a distance from a center of the connection portion of the second lever with the strut to a center of the contact portion of the second lever with the second shoe is w1, a distance from a center of the connection portion of the second lever with the strut to a center of the support end portion of the second lever is expressed by n, wherein a distance from a center of a swing of the fourth lever to a center of the anchor member is 1, a distance from the center of the swing of the fourth lever to the center of the connection portion of the fourth lever with the third lever is expressed by Lb; and wherein the radius of the drum is expressed by r;

wherein if the brakes are applied when the drum is rotated in the first direction F, the first and second contact surfaces contact the inner peripheral surface of the drum and the second shoe as a secondary shoe is pressed by the first shoe as a primary shoe to generate an anchor load which is applied to two portions of the contact portion of the second lever with the second shoe and the anchor member, and in this state, a force applied to the first shoe by the first lever via the contact portion of the first lever with the first shoe be Fa1, a force applied to the second shoe by the first shoe be Fax, a force applied to the second lever by the second shoe via the contact portion of the second shoe with the second lever be Fa2, a load applied to the anchor member by the second shoe be Fan, and a force applied to the first lever by the driving force generating unit be F0;

further, a straight line passing the center of the drum is a reference line Z, a distance from the center of the anchor member to the reference line Z be an, a distance from the center of the anchor member to the center of the drum is an', a distance from the contact portion of the first lever with the first shoe to the reference line Z be c1, a distance from a point of the first shoe at which a load is applied to the second shoe to the reference line Z is a1, a distance from a point of the second shoe at which a load is applied by the first shoe to the reference line Z is c2, a distance from the contact portion of the second lever with the second shoe to the reference line Z is a2, and a distance from a point of the second shoe to which a load is applied by the first shoe to the center of the anchor member is h;

a servo ratio of the first shoe by the force Fa1 applied to the first shoe is BF1 and a servo ratio of the second shoe by the force Fax applied to the second shoe by the first shoe is BF2;

A1, A2, B1, B2, D2 are expressed by the following equations:

$$A1 = (c2 + r \times BF2)(c1/a1 + BF1 \times r/a1) \quad \text{(Equation 1)}$$

$$A2 = La(1+m) \quad \text{(Equation 2)}$$

$$B1 = a2 - BF2(an-a2)r/h \quad \text{(Equation 3)}$$

$$B2 = La \times m(n+1)/n \quad \text{(Equation 4)}$$

$$D2(La \times m+1)/Lb \quad \text{(Equation 5)}$$

wherein the lever ratios of the first lever, the second lever, and the forth lever are expressed based on a brake effectiveness factor BEFmof, which is expressed by the following equation 6, by the force F0 which the driving force generating unit applies to the first lever in the first direction F;

Equation 6 is $BEFmof = [BF1 + \{1 + (an-a2)(an' \times A2 + D2 \times A1)/(an' \times B2 + D2 \times B1)/(c1,/a1 + BF1 \times r/a1)/h\}$ $BF2 \times (c1/a1 + BF1 \times r/a1)]/\{1 + (A1 \times B2 - A2 \times B1)/(an' \times B2 + D2 \times B1)/La/Lb\} \times m.$ 15. A drum brake device according to claim 14, wherein if the brakes are applied when the drum is rotated in a second direction B, the first and second contact surfaces (2a, 3a) contact the inner peripheral surface of the drum and the first shoe as a secondary shoe is pressed by the second shoe as a primary shoe to generate an anchor load which is applied to two portions of the contact portion of the first lever with the first shoe and the anchor member; and in this state, a force applied to the first shoe by the first lever via the contact portion of the first lever with the first shoe is Fa1, a force applied to the first shoe by the second shoe is Fax, a force applied to the second shoe by the second lever via the contact portion of the second lever with the second shoe is Fa2, a load applied to the anchor member by the first shoe is Fan, and a force applied to the first lever by the driving force generating unit is F0;

a distance from a center of the anchor member to a reference line Z is an, a distance from a center of the anchor member to a center of the drum is an', a distance from the contact portion of the first lever with the first shoe to the reference line Z is a1, a distance from a point of the first shoe at which a load is applied by the second shoe to the reference line Z is c1, a distance from a point of the second shoe at which a load is applied to the first shoe to the reference line Z is a2, a distance from the contact portion of the second lever with the second shoe to the reference line Z is c2, and a distance from a point of the first shoe at which a load is applied by the second shoe to a center of the anchor member is h;

a servo ratio of the second shoe by the force Fa2 applied to the second shoe is BF1 and a servo ratio of the first shoe by the force Fax applied to the first shoe by the second shoe is BF2;

A1, A2, B1, B2, D2 is expressed by equations $$A1 = (c1 + r \times BF2)(c2/a2 + BF1 \times r/a2), \quad \text{Equation 7}$$

$$A2 = La \times m(n+1)/n \quad \text{Equation 8}$$

$$B1 = \{a1 - BF2(an - a1)r/h\} \quad \text{Equation 9}$$

$$B2 = La(m+1) \quad \text{Equation 10}$$

$$D2 = (La \times m + 1)/Lb \quad \text{Equation 11}$$

the lever ratios of the first lever, the second lever, and the forth lever are expressed based on a brake effectiveness factor BEFmor, which is expressed by the following equation 12, by a force F0 which the driving force generating unit applies to the first lever in the second direction B $$BEFmor = [BF1 + \{1 + (an-a1)(an' \times A2 + D2 \times A1)/(an' \times B2 + D2 \times B1)/(c2/a2 + BF1 \times r/a2)/h\}$$

$$BF2 \times (c2/a2 + BF1 \times r/a2)]/\{1 + (A1 \times B2 - A2 \times B1)(La-1)n/(an' \times B2 + D2 \times B1)/La/(n+1)/Lb\}$$

$$\times n(m+1)/(n+1). \quad \text{Equation 12.}$$

16. A drum brake device according to claim 15, wherein the ratios of the first lever, the second lever and the fourth lever are set so that the brake effectiveness factor BEFmof is equal to the brake effectiveness factor BEFmor.

\* \* \* \* \*